United States Patent
Mayerich et al.

(10) Patent No.: US 12,117,380 B2
(45) Date of Patent: Oct. 15, 2024

(54) MILLING WITH ULTRAVIOLET EXCITATION

(71) Applicant: University of Houston System, Houston, TX (US)

(72) Inventors: David Mayerich, Houston, TX (US); Jason Eriksen, Houston, TX (US)

(73) Assignee: University of Houston System, Houston, TX (US)

(*) Notice: Subject to any disclaimer, the term of this patent is extended or adjusted under 35 U.S.C. 154(b) by 640 days.

(21) Appl. No.: 17/294,489

(22) PCT Filed: Nov. 15, 2019

(86) PCT No.: PCT/US2019/061765
§ 371 (c)(1),
(2) Date: May 17, 2021

(87) PCT Pub. No.: WO2020/102698
PCT Pub. Date: May 22, 2020

(65) Prior Publication Data
US 2021/0404917 A1   Dec. 30, 2021

Related U.S. Application Data

(60) Provisional application No. 62/767,620, filed on Nov. 15, 2018.

(51) Int. Cl.
*G06K 9/00* (2022.01)
*G01N 1/28* (2006.01)
(Continued)

(52) U.S. Cl.
CPC .............. *G01N 1/30* (2013.01); *G01N 1/286* (2013.01); *G01N 1/36* (2013.01); *G01N 21/6458* (2013.01);
(Continued)

(58) Field of Classification Search
CPC ........................................................ G01N 1/06
See application file for complete search history.

(56) References Cited

U.S. PATENT DOCUMENTS 9,810,704 B2 * 11/2017 Holmes .............. G01N 35/1072
10,012,664 B2 * 7/2018 Wasson ................ G01N 35/026
(Continued)

FOREIGN PATENT DOCUMENTS

JP      2018-063291 A    4/2018
WO    WO2006061640      6/2006
(Continued)

OTHER PUBLICATIONS

Search Report for European Patent Application No. 19884320.3, issued on Jun. 28, 2022.
Jiaming Guo et al: "Three-Dimensional Microscopy by Milling with Ultraviolet Excitation", arxiv.org, Cornell University Library, 201 Olin Library Cornell University Ithaca, NY 14853, May 4, 2019 (May 4, 2019), XP081526386, DOI: 10.1038/S41598-019-50870-1.
Tsai, P. S. et al. All-optical histology using ultrashort laser pulses. Neuron 39, 27-41 (2003).
(Continued)

Primary Examiner — Hadi Akhavannik
(74) Attorney, Agent, or Firm — Shackelford, McKinley & Norton, LLP

(57) ABSTRACT

Milling with ultraviolet excitation (MUVE) realizes high-throughput multiplex imaging of large three-dimensional samples. The instrumentation may comprise a UV-source attachment, precision stage attachment, and/or a blade assembly, and the instrumentation may overcome several constraints inherent to current state-of-the-art three-dimensional microscopy. MUVE offers throughput that is orders of magnitude faster than other technology by collecting a two-dimensional array of pixels simultaneously. The proposed instrumentation also utilizes serial ablation and provides the opportunity for true whole-organ imaging at microscopic resolution.

20 Claims, 12 Drawing Sheets

(51) Int. Cl.
*G01N 1/30* (2006.01)
*G01N 1/36* (2006.01)
*G01N 21/64* (2006.01)

(52) U.S. Cl.
CPC .......... *G01N 2001/2873* (2013.01); *G01N 2001/302* (2013.01); *G01N 2001/364* (2013.01)

(56) References Cited

U.S. PATENT DOCUMENTS

| | | | |
|---|---|---|---|
| 10,371,710 B2* | 8/2019 | Wasson | B01L 3/50855 |
| 11,041,808 B2* | 6/2021 | Mayerich | G06T 15/04 |
| 2010/0000383 A1 | 1/2010 | Koos et al. | |
| 2013/0126759 A1* | 5/2013 | Betzig | G01N 21/6458 |
| | | | 250/459.1 |
| 2014/0137715 A1 | 5/2014 | Sneyders et al. | |
| 2014/0287941 A1* | 9/2014 | Betzig | G02B 27/58 |
| | | | 506/9 |
| 2016/0048012 A1* | 2/2016 | Knebel | G02B 21/367 |
| | | | 359/385 |
| 2016/0320306 A1* | 11/2016 | Huffman | G01N 15/1434 |
| 2017/0115221 A1* | 4/2017 | Betzig | G01N 33/582 |
| 2017/0191937 A1* | 7/2017 | Levenson | G01N 21/6445 |
| 2018/0246306 A1* | 8/2018 | Lundin | G02B 21/26 |
| 2018/0310829 A1 | 11/2018 | Frangioni et al. | |
| 2019/0301980 A1* | 10/2019 | Anderson | G01N 1/06 |

FOREIGN PATENT DOCUMENTS

| | | |
|---|---|---|
| WO | WO-2009048524 A2 | 4/2009 |
| WO | WO-2012068142 A2 | 5/2012 |
| WO | WO2015175525 A1 | 11/2015 |
| WO | WO2016043991 | 3/2016 |
| WO | WO-2018160629 A1 | 9/2018 |

OTHER PUBLICATIONS

Mayerich, D., Abbott, L. & McCormick, B. Knife-edge scanning microscopy for imaging and reconstruction of three-dimensional anatomical structures of the mouse brain. Journal of Microscopy 231, 134-143 (2008).
Helmchen, F. & Denk, W. Deep tissue two-photon microscopy. Nature Methods 2, 932-940 (2005).
Huisken, J., Swoger, J., Bene, F. D., Wittbrodt, J. & Stelzer, E. H. K. Optical sectioning deep inside live embryos by selective plane illumination microscopy. Science 305, 1007-1009 (2004).
Denk, W. & Horstmann, H. Serial block-face scanning electron microscopy to reconstruct three-dimensional tissue nanostructure. PLOS Biology 2, e329 (2004).
Fereidouni, F. et al. Microscopy with ultraviolet surface excitation for rapid slide-free histology. Nature Biomedical Engineering 1, 957-966 (2017).
Evangelidis, G. D. & Psarakis, E. Z. Parametric image alignment using enhanced correlation coefficient maximization. IEEE Transactions on Pattern Analysis and Machine Intelligence 30, 1858-1865 (2008).
Yoshitake, T. et al. Rapid histopathological imaging of skin and breast cancer surgical specimens using immersion microscopy with ultraviolet surface excitation. Scientific Reports 8, 4476 (2018).
Brown, M. & Lowe, D. G. Automatic panoramic image stitching using invariant features. International Journal of Computer Vision 74, 59-73 (2007).
Office Action for Japanese Pat. App. No. 2021-526504, Mailed on Aug. 14, 2023.
Office Action for Japanese Pat. App. No. 2021-526504, mailed on Jan. 30, 2024.

* cited by examiner

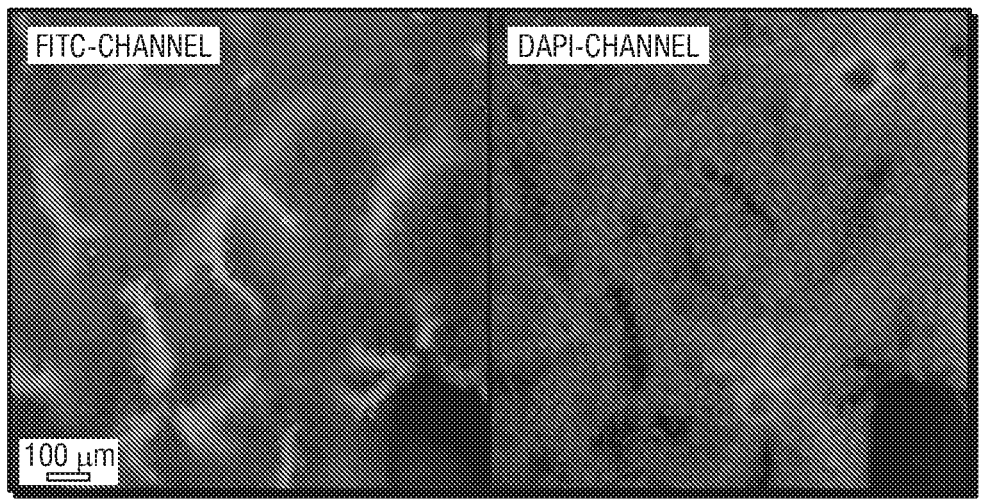
FIG. 5A
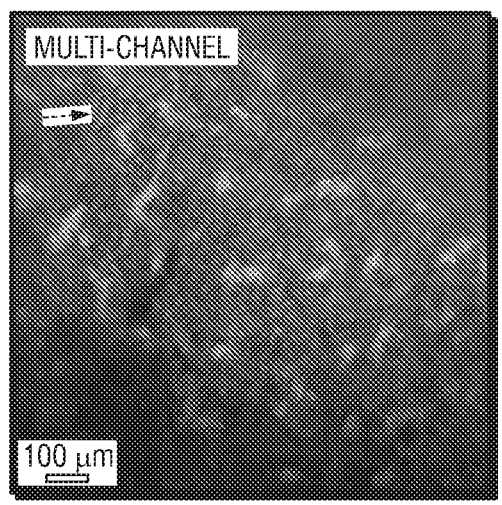 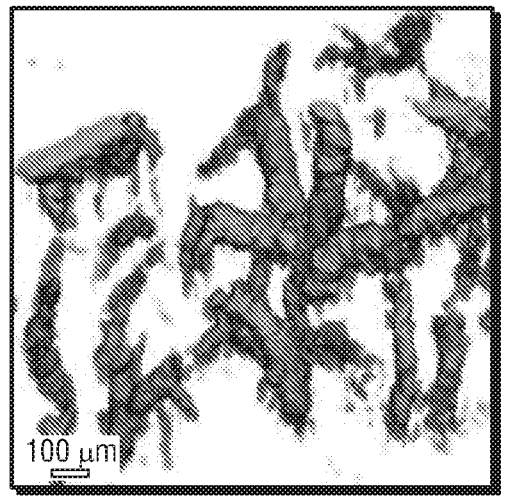
FIG. 5B  FIG. 5C

Axial Position (μm)

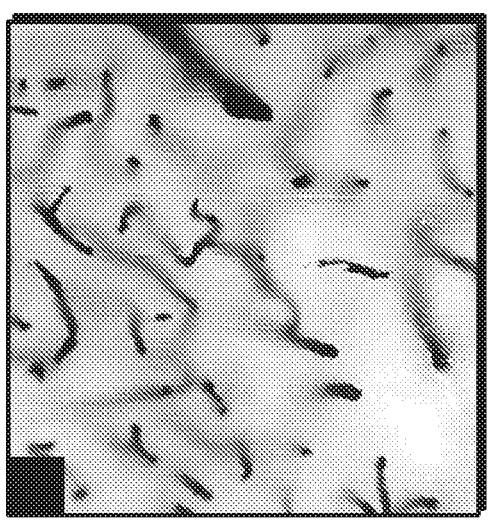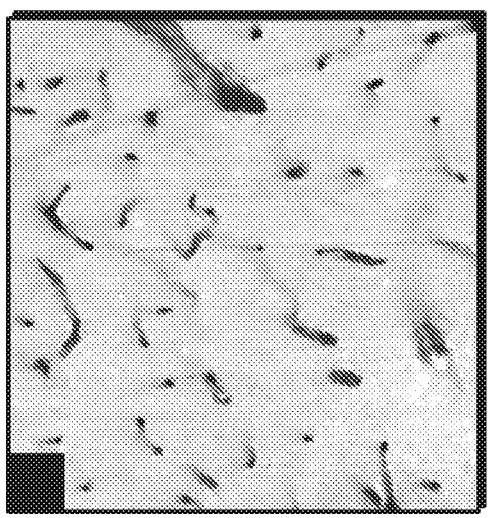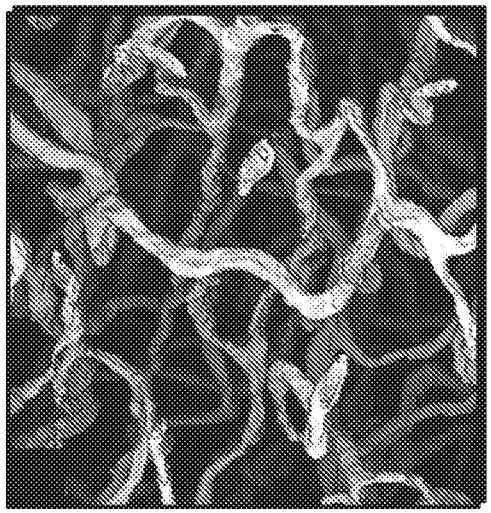
FIG. 9A  FIG. 9B  FIG. 9C
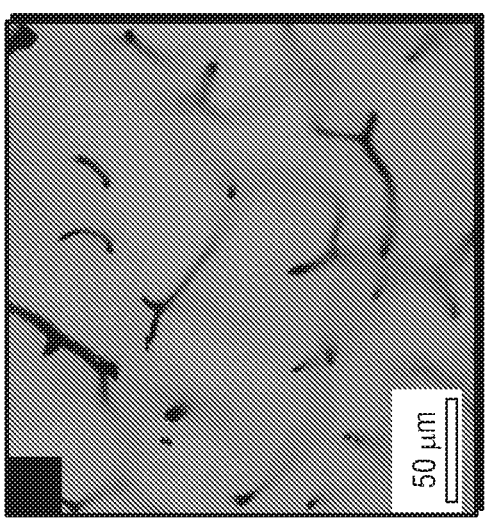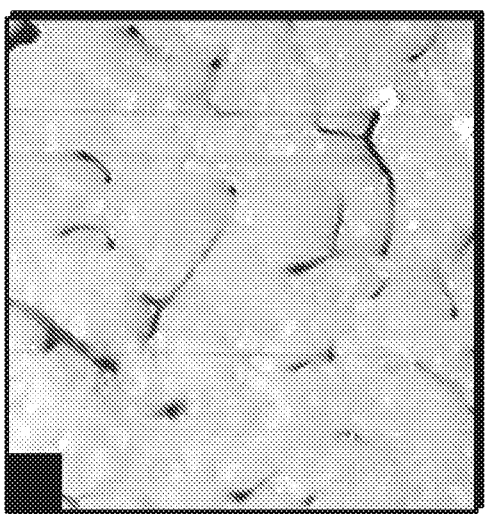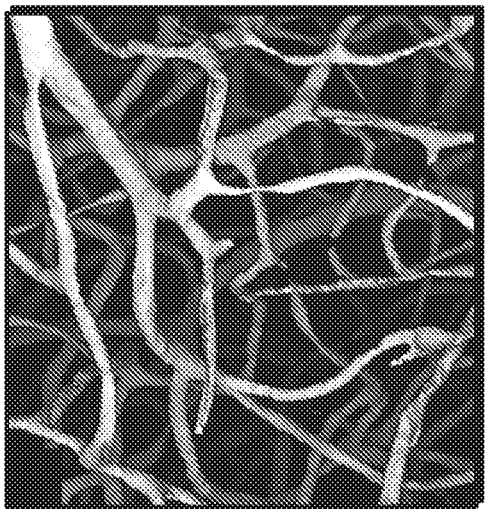
FIG. 9D  FIG. 9E  FIG. 9F
50 μm

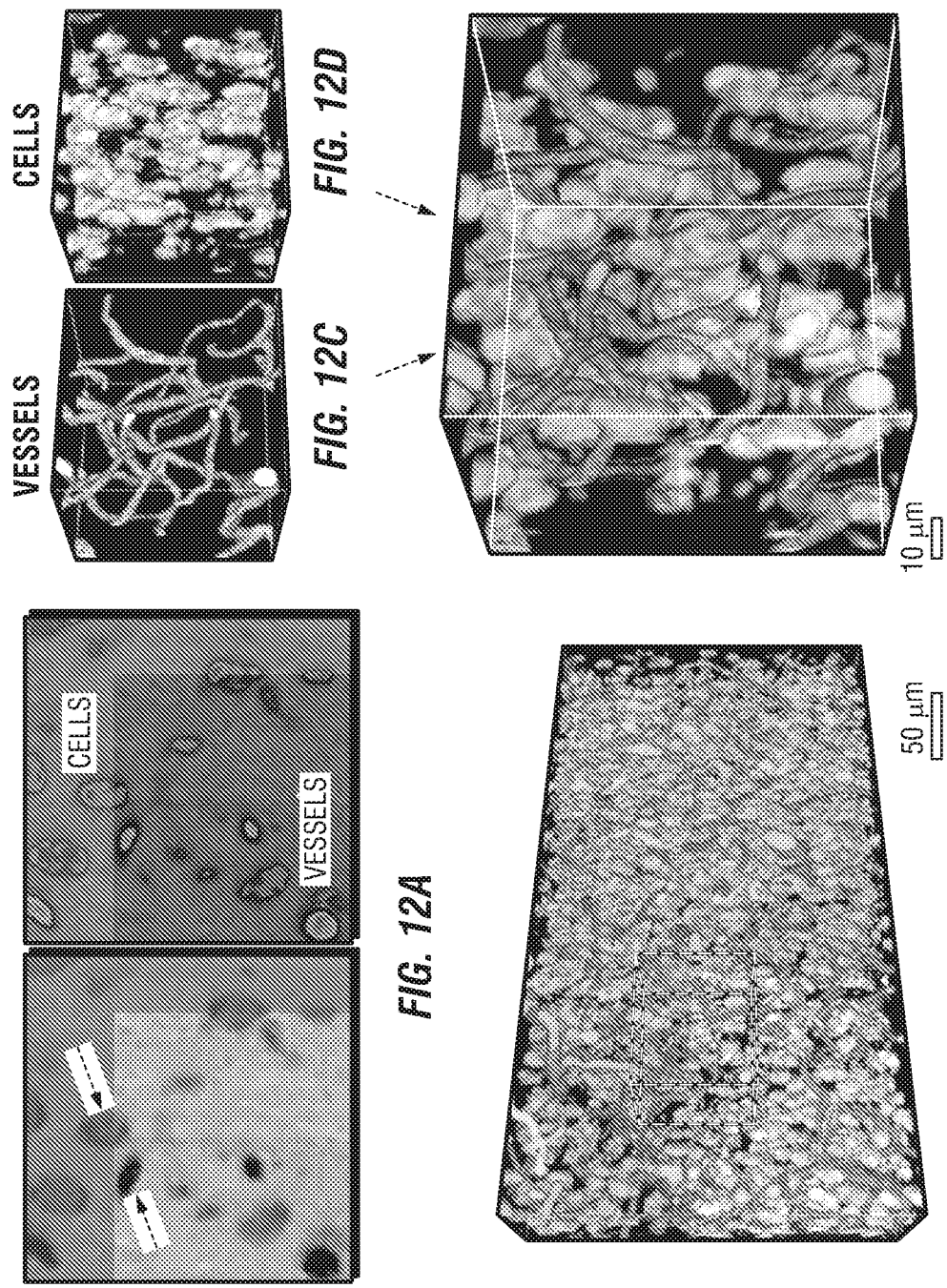

MILLING WITH ULTRAVIOLET EXCITATION

RELATED APPLICATIONS

This application claims the benefit of U.S. Provisional Patent Application No. 62/767,620 filed on Nov. 15, 2018, which is incorporated herein by reference.

STATEMENT REGARDING FEDERALLY SPONSORED RESEARCH

This invention was made with government support under grant No. 1650566, awarded by the National Science Foundation; grant No. #R01HL146745, awarded by the National Institutes of Health; and Grant No. 1R21CA214299, awarded by the National Cancer Institute. The government has certain rights in the invention.

FIELD OF THE INVENTION

This invention relates to Milling with Ultraviolet Excitation (MUVE). More particularly, to MUVE with three-dimensional imaging and/or microscopy.

BACKGROUND OF INVENTION

For background, prior work discussed in WO 2018/160629 (or PCT/US2018/020114), filed Feb. 28, 2018, titled SALT (Surface Ablation Lathe Tomography) Systems and Methods for Whole Organ Phenotyping is noted, which is fully incorporate by reference herein.

Analysis of three-dimensional biological samples is critical to understanding tissue function and the mechanisms of disease. Many chronic conditions, like neurodegenerative diseases and cancers, correlate with complex tissue changes that are difficult to explore using two-dimensional histology. While three-dimensional techniques such as confocal and light-sheet microscopy are well-established, they are time consuming, require expensive instrumentation, and are limited to small tissue volumes. Three-dimensional microscopy is therefore impractical in clinical settings and often limited to core facilities at major research institutions. There would be a tremendous benefit to providing clinicians and researchers with the ability to routinely image large three-dimensional tissue volumes at cellular resolution.

Neurodegenerative diseases and cancer affect the surrounding tissue phenotype through complex changes in the tissue structure, protein distribution, and underlying chemistry that can vary significantly across patients at the microscopic scale. Unfortunately, these changes are difficult or impossible to quantify accurately with thin sections (usually 4~6 µm) using traditional histology. Researchers and pathologists are currently in need of a comprehensive methodology that allows them to explore large tissue volumes at micrometer resolution across multiple chemical channels.

While three-dimensional methods such as confocal microscopy and multi-photon microscopy are trending techniques that provide some structural context in biological samples, these techniques are extremely slow and limited to thin (<1 mm) samples. The use of LSM mitigates the time constraint inherent in confocal, however samples are also restricted to small volumes. Several attempts have been made to overcome the thickness constraint by ablating tissue after imaging, including vaporizing tissue with a focused laser beam and cutting away tissue using a microtome. However, these techniques are extremely expensive and time-consuming for routine imaging of large samples or whole organs. In previous work in above referenced WO 2018/160629, these constraints were alleviated using an updated version of a high-throughput imaging system known as knife-edge scanning microscopy (KESM), which allows automated imaging of 1 $cm^3$ samples at sub-micrometer resolution in several hours. However, imaging using KESM requires coherent sections and is currently limited to single-channel imaging. To address these problems, a prototype imaging system termed MUVE has been developed, that performs serial block-face imaging under ultraviolet (UV) excitation to collect large-scale three-dimensional multi-channel images in biological samples (FIG. 1a).

Microscopy with ultraviolet surface excitation (MUSE) allows imaging of fresh tissue stained with UV-excitable markers. A key feature in MUSE is that UV light penetration is limited to ≈5 µm into tissue samples, allowing an image of the tissue surface to be collected in parallel without the need for raster scanning. In addition, it also allows the simultaneous acquisition of multiple fluorescent channels excited simultaneously at the tissue surface since glass optics do not effectively transmit UV wavelengths and therefore no dichroic mirrors or specific filters are used. While MUSE offers fast image collection for standard samples, these images are limited to a thin slice at the tissue surface. The prior work of WO 2018/160629 collect an image stack representing the whole tissue volume, including a microtome blade that is used to continuously ablate the surface in a circular manner to remove imaged tissue and expose deeper layers. While this would allow for continuous and automated imaging of large samples embedded in machinable mediums to reconstruct the three-dimensional tissue structure and connectivity, it requires complex processing to reconstruct a 3D image, as such further improvements are desirable.

Systems, kits, and methods proposed herein provide an imaging methodology that enables fast and inexpensive three-dimensional imaging that can be readily integrated into current histology pipelines. This method relies on block-face imaging of paraffin-embedded samples using ultraviolet excitation. The imaged surface is then ablated to reveal the next tissue section or slice for imaging. The final image stack is then aligned and reconstructed to provide tissue models that exceed the depth and resolution achievable with modern three-dimensional imaging systems. This offers 3D imaging with fast acquisition speeds comparable to 2D histology, unlimited sample thickness or size, resolution that exceeds the diffraction limit along the axial direction, and simple and low-cost construction.

SUMMARY OF INVENTION

In one embodiment, systems and methods for milling with ultraviolet excitation (MUVE) are proposed. The proposed instrumentation utilizes serial ablation, overcoming all depth limitations inherent in optical methods. In some embodiments, a method for 3D imaging involves preparing a sample to be treated or stained with imaging agent(s) and embedding the sample in a supporting matrix. The resulting sample may they be utilized for imaging by exciting an exposed surface of the sample with a UV source. Once a slice is imaged, it may be cut to allow imaging of the next slice. The process of imaging and cutting slices may be repeated as desired. The gathered 2D slices may be assembled to generate a 3D image of the sample.

In yet another embodiment, a method for 3D imaging may comprise preparing a sample treated or stained with imaging agent(s) and embedding the sample in a supporting matrix. An exposed surface of the sample may be excited with a UV source and imaged. Once a slice has been imaged, it may be cut away to allow imaging of the next slice. The process of imaging and cutting slices may be repeated as desired. The gathered 2D slices may be assembled to generate a 3D image of the sample.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 5A-5C show further multi-channel imaging of MUVE.

FIGS. 9A-9F show advantages of MUVE imaging as 3D microscopy.

FIGS. 12A-12E show coronal MUVE imaging of mouse thalamus.

DETAILED DESCRIPTION

Figure 1A:
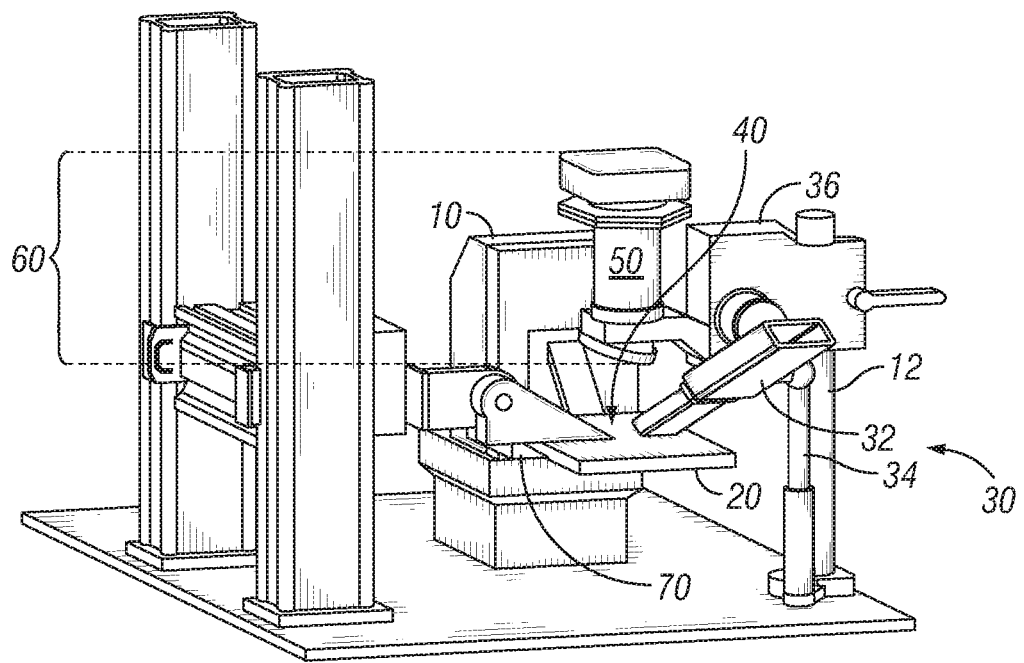
FIGS. 1A-1C show an embodiment of a MUVE imaging system or kit.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art. Exemplary examples discussed herein may correspond to actual experimentation or experimental setups, but shall be understood to be nonlimiting examples.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Milling with ultraviolet excitation (MUVE), as discussed further herein, realizes high-throughput multiplex imaging of large three-dimensional samples. The proposed instrumentation overcomes several constraints inherent to current state-of-the-art three-dimensional microscopy, such as confocal microscopy and light sheet microscopy (LSM). MUVE offers throughput that is orders of magnitude faster than confocal microscopy by collecting a two-dimensional array of pixels simultaneously. The proposed instrumentation also utilizes serial ablation, overcoming all depth limitations inherent in optical methods such as confocal and LSM, and providing the opportunity for true whole-organ imaging at microscopic resolution. MUVE is significantly less expensive than existing methods and provides the potential for greater spatial resolution when acquiring images.

Basic principles behind MUVE systems and methods based on imaging of macro-scale phantoms and biological samples are discussed further herein.

Imaging Principles: UV Excitation of Fluorescence

Figure 2:
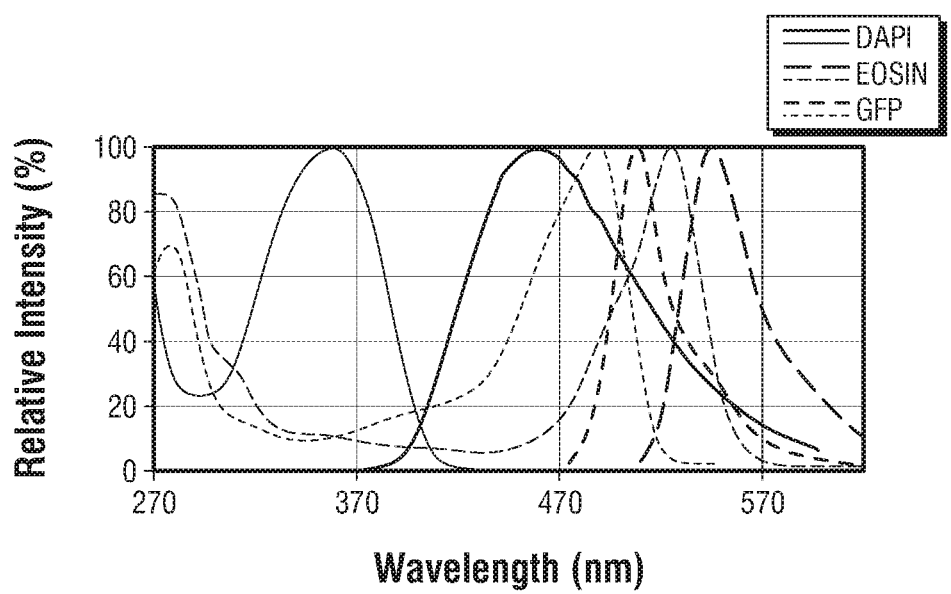
FIG. 2 shows excitation (dashed) and emission spectra of common fluorescent dyes.

An important principle behind MUVE imaging is fluorescence excitation. Many common fluorophores have excitation peaks in UV wavelengths that trigger their traditional emission frequencies. FIG. 2 shows excitation (dashed) and emission spectra of common fluorescent dyes. The use of UV excitation provides broadband fluorescence emission with large Stokes' shifts and does not occupy emission bandwidth. Since glass optics such as traditional objectives are opaque to UV, no emission filters are required to exclude signals arising from excitation light and all collected signals contribute to the final image. This allows the simultaneous acquisition of multichannels in biological samples stained or treated with multiple fluorescence dyes.

Limited Penetration Depth of UV Excitation

The main advantage of UV excitation is that UV penetration in tissues is limited by absorption and scattering, significantly minimizing the emission volume to 10 μm or less under direct illumination. This is comparable to the thickness of a traditional histology section. As such, the UV penetration depth may be closely matched to a thickness of a section removed by a microtome blade or the like. However, the application of oblique cis-illumination in MUSE can drastically reduce the excitation thickness since deep-UV has tighter optical focusing. Further investigation has demonstrated that using a higher incident angle or water-immersion illumination, the excitation thickness could be further adjusted (≈50% reduction), but has a tradeoff with illumination intensity.

Serial Sectioning of Tissue

Several approaches have been proposed for integrating block-face microscopy with serial ablation to enhance axial resolution and image depth. Early studies rely on all-optical imaging and ablation, which is time-consuming but applicable to a wide range of tissues. Serial block face scanning electron microscopy (SBF-SEM) uses a microtome blade for ablation, providing nanometer-scale resolution of samples embedded in hard polymers. Alternative approaches achieve similar results using focused ion beams. However, these methods are limited to extremely small micrometer-scale samples and lack molecular specificity.

Integration of microtome sectioning with optical approaches has been proposed for large-scale imaging. However, these instruments are extremely expensive to construct and difficult to maintain. For example, knife-edge scanning microscopy (KESM) requires high-precision stages and time-consuming sample protocols, coherent sectioning, and complex image processing for reconstruction, while two-photon tomography requires expensive two-photon imaging systems.

In contrast, the systems and methods discussed herein may perform imaging prior to sectioning a sample, block-face imaging, and does not require complex image processing.

PSF Characterization

The systems and method allow for labeling of samples after paraffin infiltration using fluorescent dyes, e.g. DAPI, Hoesch, eosin, green fluorescent protein (GFP), or the like. The use of UV doping materials improves the point spread function, which allows the use of block-face imaging instead of other complicated approaches. To characterize the point spread function (PSF) of MUVE and compare to traditional confocal microscopy, diffraction-sized fluorescent beads (Cospheric 1~5 μm polystyrene microsphere) were diluted 1000 folds in paraffin to approximate an ideal point source.

Similar to traditional fluorescent microscopy, the lateral resolution of MUVE is mainly determined by the objective based on the Reyleigh formula. For an objective with a 0:25 numerical aperture (NA), the lateral resolution is ≈1:26 μm.

Benefits of the systems, kits, or methods PSF come in two forms (FIGS. 7A-7L & 8A-8E): (1) physical ablation results in a truncated asymmetric emission spot, since previous layers of the sample have been removed, and (2) absorbance of the doped embedding medium dominates the penetrating half of the PSF. This allows reconstruction of elements (e.g. lower parts of spheres) obstructed using optical sectioning.

Instrumentation

Figure 1B:
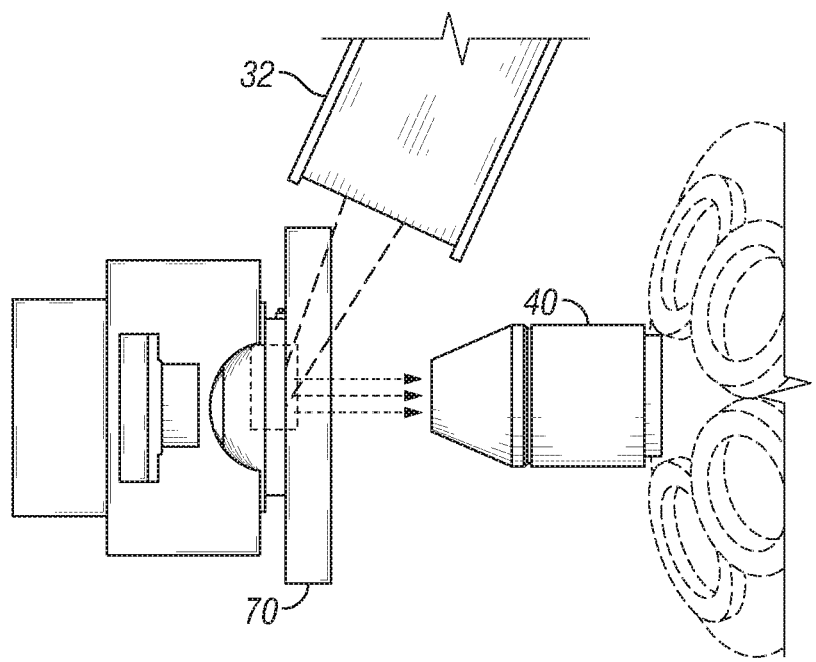
Figure 1C:
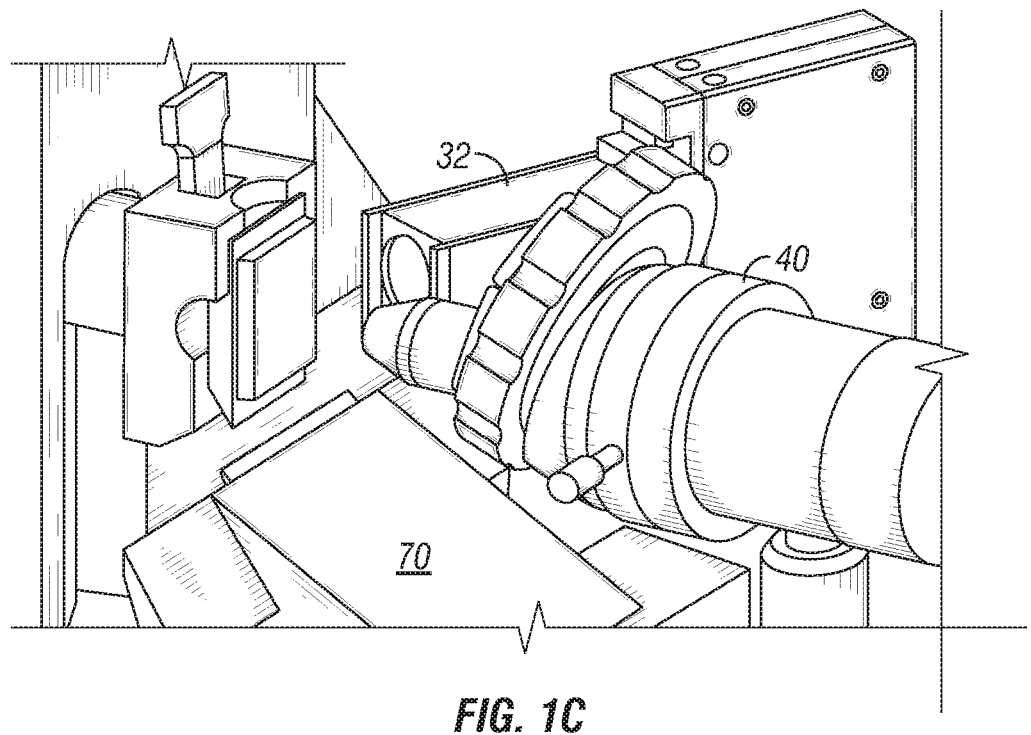

MUVE systems, kits, and methods discussed herein are designed to act simultaneously as both a microscope and a microtome, composing of a UV-microscope, a blade, and a specimen stage. A UV-microscope may comprise a UV source and objective. A specimen stage may support a sample, and a microtome comprises a blade assembly to cut the sample. The image acquisition may be achieved by a customized MUVE system comprising a camera. FIGS. 1A-1C show an illustrative concept of a MUVE imaging system and method discussed in further detail herein.

FIG. 1A an illustrative example of a MUVE system or kit, which was designed to act simultaneously as both a microtome and a UV-microscope. While the example shown is a custom solution, in some embodiments, the MUVE system, kit, and method may be designed as UV and/or precision stage attachments suitable for use with any suitable existing microtome, cryotome, or the like. Pre-existing microtomes generally provide a specimen or sample plane that a sample can be place on or secured by. The blade may allow planar slices of the sample to be cut, either manually or automatically.

As shown in FIG. 1A, the system or kit may include a UV source attachment 30 that is adjustable to focus on a desired portion of a sample (e.g. 0, =70°), either manually or automatically. The UV source attachment 30 may provide a UV source 32 capable of generating the desired UV signal, a mount 34 suitable for mounting the attachment to the microtome, and optional adjustment components 36 that allow the UV source to be adjusted as desired if necessary. Because doping of the sample to a controlled depth is relied on, any UV source 32 may be utilized and tuning of section thickness can easily be performed without the need to tune the UV source. The mount 34 may be any suitable means for mounting the attachment as desired, such as to an existing/custom microtome, cyrotome, a suitable base, or the like. As a nonlimiting example, the UV source 32 is pivotally mounted to an arm that is slidable on a boom that is secured to the base of the microtome by the mount 34. In automatically adjusted examples, the mount 34 may further provide optional adjustment components 36 allowing adjustment of UV source 32 in x, y, and/or z directions, such as electric motors, servos, or the like controlled by a suitable controller to focus the UV source as desired.

Further, in some embodiments, the system or kit may also include a precision stage attachment 10 that allows a camera 60 to be positioned as desired to image slices of the sample. The precision stage attachment 10 may be mounted by any suitable means as desired, such as to an existing/custom microtome, cyrotome, a suitable base, or the like. The precision stage attachment 10 provides a support 12 that secures the camera 60, as well as any optional lenses 50 or objectives 40 if desired, in a position near sample that is suitable for capturing image slices. Further, the support 12 may include adjustment mechanisms that allow the support and camera to be adjusted in x, y, and/or z directions as desired for imaging the sample. In automatically adjusted examples, the precision stage attachment may further provide electric motors, servos, or the like controlled by a suitable controller to adjust the position of the camera as desired. In some embodiments, the camera captures one or more images of the sample representing an entirety of the exposed surface. In some embodiments, multiple images form a set of images representing the exposed surface. When a next exposed surface is revealed (i.e. after an imaged slice is cut away), the camera may captures one or more next images of a next exposed surface. This process may be repeated until the entire sample is imaged or until desired imaging is complete. Subsequently, a 3D image is assembled from the gather 2D images.

In yet another embodiment, the entire system or kit may be custom made, including the microtome components and attachments discussed previously above. The UV source and precision stage attachments may correspond to any of the embodiments discussed previously. In the embodiment shown, the system or kit may also include a blade assembly 70. In some embodiments, the blade assembly may include a specimen plane or stage 20 provides a suitable location that a sample to be imaged may be placed. The plane 20 allows the sample to be positioned near the precision stage attachment 10 and UV source attachment 30. As discussed previously, the stage and source attachments may be adjustable for precise alignment with the sample to be imaged. In the embodiment shown, the blade assembly (or microtome assembly) 70 also includes a blade and blade actuator that includes suitable components to precisely move the blade in x, y, and/or z directions to cut flat, planar slices of the sample when desired (e.g. $\theta_s=$) 10°. In some embodiments, a thickness of the flat, planar slices of the sample cut corresponds to the thickness of an imaged portion of the sample. In yet another embodiment, the plane 20 may be capable of adjustment to facilitate cutting of the sample. In some embodiments, the sample may be prepared in any suitable manner, such as those discussed further herein or discussed in WO 2018/160629. As a nonlimiting example, the sample may treated or stained with an imaging agent, such a fluorescent or other agents, and may also be embedded in a supporting matrix (e.g. wax, paraffin wax, hydrogel, resin, or the like). An embedded sample may be any suitable shape, such as a rectangular shape, square shape, a cube, or a rectangular cuboid. As such, the flat, planar slices imaged, and later cut, are uniform in size. Further, the imaged slices (and cut slices) may be 2D rectangles or squares.

While the embodiment shown may appear to be limited to a single field of view (FOV), it shall be understood that other embodiments may utilize 3-axis UV source attachments, precision stages, and/or blade assemblies—thereby allowing the systems, kits, or methods to provide multi-axis FOVs.

In some embodiments, the system or kit may further comprise a CPU, processor, microprocessor, or the like. The processor may be coupled to the UV source attachment, precision stage attachment, and/or blade assembly. Further, the processor may be responsible for controlling such attachments or assemblies during various steps of methods discussed herein. As discussed previously, adjustment of the UV source, camera, and/or blade may be automatically performed in some embodiments. Further, any image capturing steps may also be performed automatically in some embodiments. In some embodiments, operation of the blade assembly may be automated to cut away and lift away imaged slices of the embedded sample. In some embodiments, storage may provide firmware, software, or programming to automate such desired features. As nonlimiting examples, the processor and/or accompanying software may be utilized automate operation, excitation, and/or adjustment of the UV source attachment; operation, adjustment, and/or image capturing of the precision stage attachment and/or camera; or operation, cutting, and/or adjustment of the blade assembly.

FIG. 1B shows a close-up view of the imaging region showing the limited tissue penetration of UV. It shall be apparent to one of ordinary skill that the higher incident angle ($\theta_2 > \theta_1$) yields a shallower penetration depth ($d_2 < d_1$) in oblique illumination. An oblique deep-UV illumination configuration with controlled incident angle for high-resolution imaging was applied. Additionally, other factors may also be utilized to tune the desired depth of UV penetration. In some embodiments, the UV source obliquely excites the embedded sample. In some embodiments, the depth of UV penetration is tuned to approximately match the thickness of slices cut from the sample. In some embodiments, aids (e.g. a liquid interface) may optionally be desirable to provide more uniform UV excitation, but such aids are not required and are entirely optional.

In a nonlimiting example, excitation light was provided by a UV light source, such as a light-emitting diode (LED) source (e.g. Phoseon FireEdge FE200) with peak emission wavelength at 280 nm and maximum output power at 300 mW. Fluorescent photons were collected using a charge-coupled device (CCD) color camera (e.g. Thorlabs 1501C-GE), through an objective, such as 20× Achromat objective with a 0:4 NA (e.g. Olympus RMS20×), a suitable tube lens, such as a lens with a 180 mm focal length (Olympus U-TLU), and a suitable camera adapter (e.g. 0.5× Olympus U-TV0.5XC-3). A knife (e.g. diamond) was rigidly mounted to provide a means of cutting individual sections after finishing collecting frames of the tissue surface. To this end, an assembled precision stage coupled to the blade and blade assembly is built to realize smooth cutting as well as large-scale scanning. The stage, blade, and/or blade assembly allow flat, planar slices of the tissue sample to be serially ablated after imaging.

For example, in some embodiment, after UV excitation and imaging of a flat, planar slice or section of the tissue sample, the slice may be ablated, and then imaging and ablation of the next flat, planar slice may be performed. The process may be repeated until the entire tissue sample has been imaged. Notably, a flat, planar slice is ablated, whereas SALT involves ablation of radial slices. This allows the tissue to be kept for further histology since a traditional microtome is used for sectioning. Once imaging of the various sections is complete, the sections may be assembled into a 3D image of the tissue sample. Because planar slices are imaged assembly of a 3D image is greatly simplified (imaging of radial shells or slices requires complex algorithms to process the imaging into a 3D image). In some embodiments, the flat, planar images captured are essentially 2D images that may be assembled to generate a 3D image. The use of 2D slices may provide significantly higher bandwidth for small samples. MUVE relies on high exponential absorbance to limit section thickness, making it more amenable to deconvolution algorithms for 3D reconstruction. This may be desirable since the field of view may be limited, such as in examples, where it was limited to a 0:89784 mm×0:6708 mm window.

In a nonlimiting example, the specimen stage was constructed by stacking two different precision stages to provide accurate three-dimensional movement, including a two-axis mechanical stage (Aerotech ANT130-XY) and an air-bear stage (Aerotech ANT130-L-Z). All stage control and camera firing applications were programmed in C++, allowing the automatic acquisition of large tissue volumes without human interaction.

Methods: Paraffin Phantom or Sample Preparation

An initial step for the method is to prepare a sample for imaging. In some embodiments, a sample may be treated or stained with at least one imaging agent, such as fluorescent or other agents, to produce a treated sample. In some embodiments, the imaging agent comprises multiple imaging agents utilized to treat or stain the sample, such as where multi-channel imaging is desired. Nonlimiting examples of imaging agent(s) may include 4',6-diamidino-2-phenylindole (DAPI), Hoesch 33342 (HO 342), eosin, GFP, fluorescent ink, fluorescent resin, acrylic ink, vasQtec UV-yellow, vasQtec PU4ii, fluorescein, isothiocyanate (FITC), rhodamine, quantum dots (QDs), UV27, epolin, or the like. Additionally, the sample may also be embedded in a supporting matrix, such as wax, paraffin wax, hydrogel, resin, glycol methacrylate, or the like, to produce an embedded sample. In some embodiments, the embedded sample formed may be any suitable shape, such as rectangularly shaped, squarely shaped, a cube, or a rectangular cuboid. In some embodiments, it may optionally be desirable to utilize a supporting matrix that absorbs UV (e.g. glycol methacrylate) or include an imaging agent in the supporting matrix, such as any of the agents discussed previously above. Nonlimiting examples of suitable sample preparation can also be found in WO 2018/160629 as well.

To demonstrate the basic principles of MUVE imaging with a nonlimiting example, a three-step phantom preparation protocol was developed that allows creating a fluorescent phantom for cutting and imaging in a short amount of time. In some embodiments, imaging may be possible in 5 minutes or less. In some embodiments, the tissue sample may be embedded in a paraffin mold. For example, polydimethylsiloxane (PDMS) master molds with sub-millimeter features were first designed and created following common molding process. To create fluorescence-labeled phantoms embedded in machinable mediums compatible to current UV tomography, paraffin wax was used for casting and embedding. However, common paraffin may not effectively absorb UV, and therefore in some embodiments it is desirable to have a UV absorber (e.g. Epolight UV27) doped into the paraffin to enhance UV absorption and reduce excitation volumes. Phantoms were therefore cast with fluorescence-labeled (e.g. UV27-doped) paraffin using the master mold. The cured casts embedded in UV27-doped paraffin were then mounted on a traditional cassette for cutting and imaging. Note that casts may need to be coated with a thin layer of paraffin to avoid deformation depending on the phantom size.

Figure 3A:
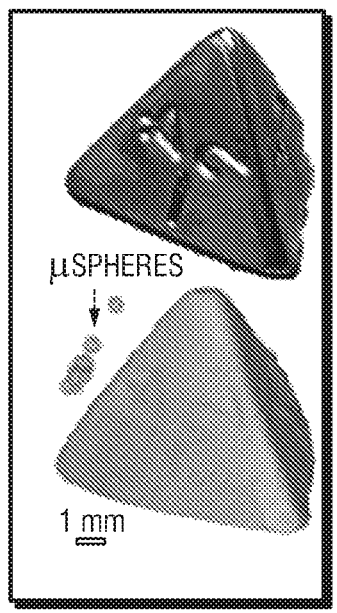
FIGS. 3A-3B show digital replication of paraffin phantom using MUVE.
Figure 3B:
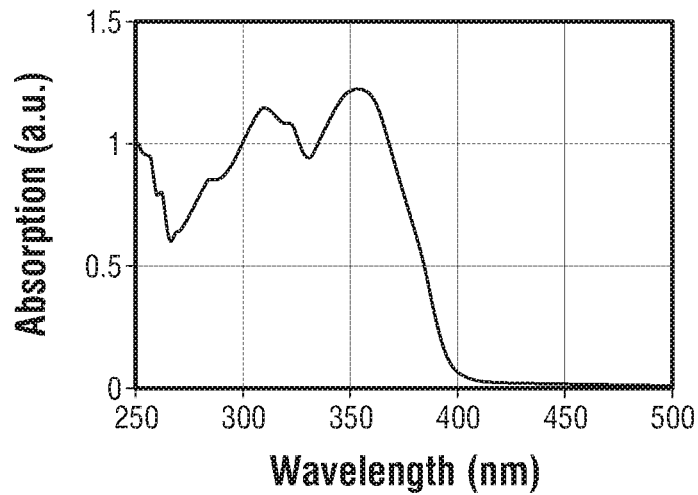

FIGS. 3A-3B show actual and digital replication of the phantom using MUVE and the absorption spectrum. FIG. 3A shows a complete four-sided die with surface features (top) was accurately cast, imaged, and reconstructed (bottom). In FIG. 3B, it can be observed that the absorption spectrum of UV27 has a great absorption in deep-UV wavelengths and does effectively transmit visible wavelengths. This spectrum was acquired using a UV/Visible spectrophotometer (SHIMADZU UV-1800). (a) SB=1 mm.

Paraffin Tissue Preparation

In some embodiments, in addition to being treated or stained with an imaging agent, the sample may be processed in a particular manner to aid treatment or staining with the imaging agent. In some embodiments, it may be desirable to optionally process a sample for vascular morphology, microvascular imaging, corrosion casting, or immunostaining. In some embodiments, it may be desirable to optionally process a sample via en bloc perfusion, such as to aid imaging of vascular morphology or corrosion casting. In yet another embodiment, it may be desirable to optionally process a sample transcardially. In some embodiments, it may be desirable to optionally treat a sample for increase resistance of vascular walls for fixation. As nonlimiting examples, a sample may be treated with formaldehyde or any other suitable options for increasing resistance of vascular walls. In some embodiments, it may optionally be desirable to macerate and/or dehydrate samples. In some embodiments, in addition to treatment or staining with a first imaging agent, it may be desirable to treat or stain the sample with at least one additional imaging agent(s), as the systems and methods are suitable for multi-channel imaging. In some embodiments, it may be desirable to optionally treat a sample with a fluorescent marker for immunostaining. Nonlimiting examples of fluorescent markers may include 4',6-diamidino-2-phenylindole (DAPI), Hoesch 33342 (HO 342), eosin, GFP, fluorescent ink, fluorescent resin, acrylic ink, vasQtec UV-yellow, vasQtec PU4ii, fluorescein, isothiocyanate (FITC), rhodamine, quantum dots (QDs), UV27, epolin, or the like.

En bloc perfusion. En bloc perfusion is widely used to duplicate vascular morphology for paraffin-based imaging. There are two common materials used for perfusion: ink and resin. In prior work, India-ink was perfused to increase contrast in KESM data, but would pose a problem for fluorescence imaging since India-ink is often non-fluorescent. However, fluorescent ink circumvents this problem, and fluorescent ink can be used for vascular labeling.

To this end, mice were deeply anesthetized in nonlimiting examples using $CO_2$ and perfused transcardially with 20 mL of room temperature (25° C.) neutral phosphate-buffered saline (pH 7.4) to remove blood from circulatory system. Mice were then perfused with 20 mL of room temperature formaldehyde to increase resistance of vascular walls for fixation. Short after fixation, mice were perfused with 10 mL of fluorescent ink (e.g. Daler&Rowney acrylic ink) in an optimal speed and bodies were macerated in formalin under zoom temperature for 24 h. After 24 h, all the organs were collected and dehydrated through a series of graded ethanol ranging from 70% to 100% for in total 8 h, followed by xylene substitute (SIGMA A5597) for 3 h, and then infiltrated in 58° C. liquid paraffin for 2 h. The whole paraffinization process was performed with the help of a tissue processor (e.g. Leica TP1020). Finally, paraffinized organs were embedded in paraffin blocks for cutting and imaging.

For corrosion casting, mice were deeply anesthetized and fixed following the same protocol described above. Fluorescence-labeled (e.g. vasQtec UV-yellow) resins (e.g. vasQtec PU4ii) were perfused transcardially for polymerization and bodies were stored under room temperature for 48 h. After complete polymerization, all organs were collected and macerated in 15% potassium hydroxide (KOH) for 12 h for corroding away the surrounding tissues. Finally, cast samples were embedded in UV27-doped paraffin for cutting and imaging.

Immunostaining. To demonstrate multi-channel imaging, perfused samples were stained with another fluorescent marker such as DAPI, Hoesch, eosin, GFP, or the like, but these fluorescent signals do not preserve well in paraffinization. However, DAPI staining in paraffinized tissue could be done to some extent. Towards this end, paraffinized samples were soaked in DAPI solution (e.g. Fluoro-Gel II) for 48 h depending on the size of the sample. Depending on the tissue size, the staining depth can be as far as 1 mm after one week maceration.

Glycol Methacrylate Tissue Preparation

In some embodiments, it may be desirable to embed a sample in resin, rather than paraffin. As a nonlimiting example, glycol methacrylate (e.g. Technovit 7100) is an alternative embedding resin for light microscopy and has some advantages over paraffin. Not only does Technovit 7100 behave as a transparent machinable medium, but also it absorbs UV light (FIG. 3B). For glycol methacrylate tissue preparation, perfused organs were first dehydrated using the gradual dehydration approach described above, followed by 2 h soaking in the pre-infiltration solution prepared by equally mixing absolute ethanol with Technovit 7100 basic solution. Samples were then infiltrated in the infiltration solution created by dissolving 1 g Technovit 7100 hardener 1 in 100 mL of Technovit 7100 basic solution under zoom temperature for 24 h. After infiltration, samples were carefully positioned in a plastic mold filled with the polymerization solution and sealed for polymerization under zoom temperature for 2 h. The polymerization solution was prepared by diluting 1 mL of Technovit 7100 hardener 2 in 15 mL of the infiltration solution.

The basic principles behind the prototype MUVE imaging system based on macroscopic phantom imaging have been discussed and demonstrated herein. The practical use of MUVE in biological research by imaging of biological samples across multiple mouse organs has also been demonstrated herein.

Macro-Scale Sample or Phantom Imaging

Once the sample is prepared and embedded in a supporting matrix via any of the embodiments discussed above, the embedded sample may be imaged utilizing the previously discussed MUVE systems and methods. In some embodiments, the embedded sample may be positioned as desired on a specimen plane. A UV source may be adjusted, if necessary, to properly excite an exposed surface of the embedded sample. In some embodiments, the embedded sample is obliquely excited by the UV source at a desired angle corresponding to a desired depth. The UV source excites a flat, planar region of the embedded sample to be imaged. In some embodiments, the depth may be 10 μm or less. In some embodiments, the depth may be 5 μm or less. Similarly, a camera may also be adjusted, if necessary, such as by the precision stage. The camera captures one or more image(s) of the exposed surface of the embedded sample, wherein the one or more images forms a set of images representing the entirety of the exposed surface of the embedded sample. The captured image(s) represent a flat, planar layer or slice corresponding to the exposed surface. In some embodiments, an entire exposed surface may be captured in a single image, but large embedded samples may require capture of multiple images to cover the entire exposed surface. In some embodiments, the UV source may excite multiple fluorescent channels. In some embodiments, filters may be utilized to allow channel(s) of particular interest to be captured by the camera. Other embodiments may be filter-free to allow filter-free or multi-channel images to be captured.

The capture of multiple images to cover an entirety of the exposed surface may be referred to herein as mosaicking. In some embodiments, mosaicking involves capturing a first image of a first region of the exposed surface excited by the UV source, then shifting the sample or camera incrementally to capture a next image of the next region excited by the UV source that is adjacent to the first region. The process may be repeated until images of the entire exposed surface are captured, such as when the sample is too large to capture with a single image. In some embodiments, the captured mosaic images may include assembly data, such as position or sequence information, that aids assembly of the images into 2D image. Subsequently, a complete 2D image of the entire exposed surface or slice may be assembled from the images collected. In yet another embodiment, the methods and systems discussed herein may allow the entire surface or 2D flat, planar surface of the embedded sample to be captured, thereby avoid the need for mosaicking.

Once image(s) of the exposed surface or slice have been captured, the imaged slice of the embedded sample may then be cut by a blade assembly, and lifted away if necessary. The slice cut away by the blade assembly corresponds to the flat, planar imaged slice, or in other words, approximately shares the same thickness or is slightly smaller than the imaging depth. In some embodiments, the thickness of the slice cut may be 10 μm or less. In some embodiments, the thickness of the slice cut may be 5 μm or less. The above imaging capturing and cutting steps may be repeated until the entire embedded sample is imaged or until a desired portion of the embedded sample is imaged. For example, the UV source is adjusted (if necessary) and excites the next layer of the embedded sample exposed by the prior cutting step, and then the camera is adjusted (if necessary) and captures image(s) of this newly exposed surface of the embedded sample. This imaged slice may then be cut away so the process can be repeated as desired or until the entire embedded sample is imaged. As the cut away slices may resemble slices seen from a conventional microtome, the slices may be kept for further imaging or examination if desired. Thus, the process is non-destructive or does not render the embedded sample unusable for further imaging or processing.

Once the repeated image capture and cutting away of slices from the embedded sample is complete, the captured images are utilized to generate a 3D image of the sample. In embodiments involving mosaicking, 2D images may be assembled based on a captured mosaic image set that is assembled after the mosaic image set is captured or after imaging is of the entire embedded sample is complete. To generate a 3D image of the sample, a set of 2D images are merged in order to generate the 3D image. In some embodiments, an alignment algorithm may be utilized to compensate for any changes to a cutting axis of the blade assembly during operation. In some embodiments, the 2D images may include 3D assembly data, such as slice position or sequence information that aids assembly of the images into a 3D image. In some embodiments, the system, kit, or methods discussed herein may provide axial resolution beyond the diffraction limit. In some embodiments, the system, kit, or methods discussed herein may provide 10 μm lateral resolution or less. In some embodiments, the system, kit, or methods discussed herein may provide 5 μm lateral resolution or less. In some embodiments, the system, kit, or methods discussed herein may provide 1 μm lateral resolution or less.

Figure 4A:
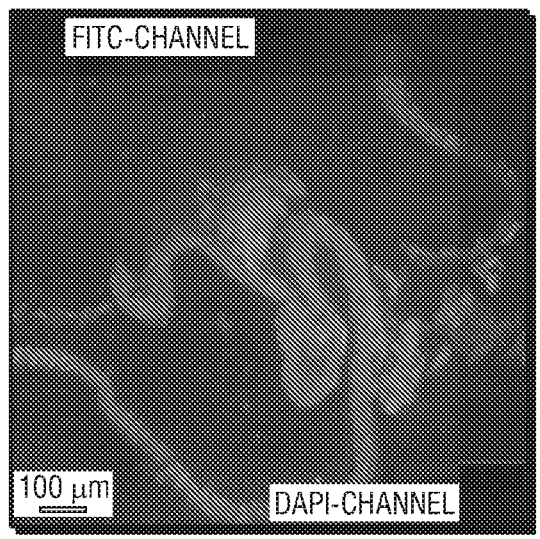
FIGS. 4A-4B show multi-channel imaging using MUVE.

To validate the idea of MUVE, a nonlimiting example involving a four-sided die was molded and embedded it in paraffin. Sub-millimeter polystyrene beads (e.g. fluorescent Cospheric 500~600 μm polystyrene microsphere) were also diluted in the paraffin block for multi-featuring. The cast was imaged at a 10 μm lateral resolution and cut into 5 μm sections. An iso-surface rendering of the images shows perfect replications, including the overall structure, numbers, and suspended microspheres (FIG. 4A). This also demonstrates the capability of large-scale ($\approx 1$ cm$^3$) three-dimensional imaging of MUVE.

Figure 4B:
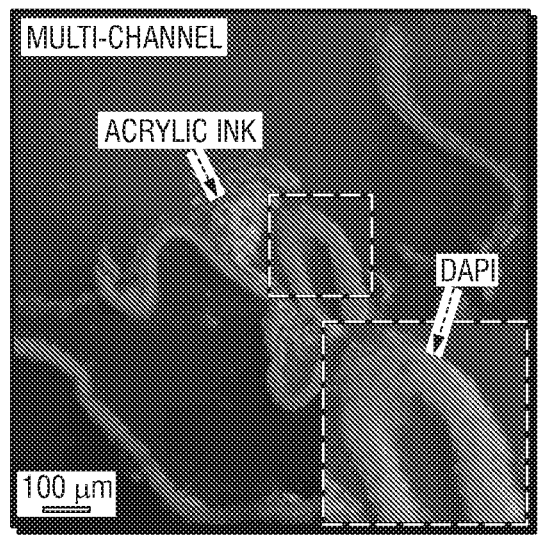

FIGS. 4A-4B show multi-channel imaging using MUVE. FIG. 4A shows imaging of a Technovit 7100 section (20 μm) using the inverted microscope with a 10× Fluorite objective (Nikon N10X-PF, NA=0:3). Different filters were used for multi-channel imaging. FIG. 4B Filter-free multi-channel imaging using MUVE. (a-b) SB=100 μm.

Biological Tissue Imaging

In another nonlimiting example, fluorescence ink perfused lung tissue was imaged at a 0:7 μm lateral resolution and cut into 1:0 μm sections.

FIGS. 5A-5C show further multi-channel imaging of MUVE. FIG. 5A shows imaging ink- and DAPI-labeled, paraffin-embedded lung tissue using the inverted microscope with a Nikon 10× (NA=0:3) objective. Different filter cubes (FITC- and DAPI-filter, left and right respectively) were used to collect fluorescent signals emitting in different wavelengths. FIG. 5B shows UV excitation used in MUVE allows multi-channel imaging without specific filters. FIG. 5C shows three-dimensional volume rendering of the reconstructed lung tissue using Amira. (a-c) SB=100 μm.

The MUVE imaging system was demonstrated to be a viable option in generating three-dimensional biological data that outperforms other technology.

MUSE Milling

As a nonlimiting example, a simplified MUVE system utilized for demonstrations discussed herein, which may be referred to as improved MUSE milling, was initially constructed for preliminary validation. This instrumentation was constructed by simply mounting a UV microscope to a commercial microtome (ThermoFisher HM355S). Excitation light was provided by a mounted LED (Thorlabs M280L3) with nominal emission wavelength at 280 nm and typical output power at 30 mW. This LED was connected to a LED driver (Thorlabs DC4100) to supply the LED with a constant current at 350 mA. Images were captured using a monochrome CCD camera (Thorlabs 1500M-GE) through a wide-field scanning lens (Thorlabs LSM02). As an image of the entire surface was collected, tissue was ablated by the microtome to expose deeper layers for serial imaging. However, as the microtome may oscillate slightly around its default position causing microscopic offsets along the cutting axis, and an alignment algorithm was implemented for compensation.

Stage Control and Camera Firing

Motion control applications were implemented using the A3200 controller, and all commands were programmed in C++ using the A3200 C library. Camera firing was also coded in C++ using the Thorlabs scientific imaging SDK. In general, the image acquisition may comprise two steps: mosaicking and sectioning. Samples were shifted consecutively with an utmost increment for whole-field scanning, such that a montage of the tissue surface can be assembled with minimal artifacts. Samples were then sectioned by the blade and lifted up along the z axis by 1 µm.

The examples discussed herein are included to demonstrate particular aspects of the present disclosure. It should be appreciated by those of ordinary skill in the art that the methods described in the examples merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Experimental Examples

MUVE instrumentation. The prototype MUVE imaging system (e.g. FIGS. 1A-1C) is based on an HM355S motorized microtome (Thermo Fisher Scientific) capable of automated 0.5 to 100 µm sectioning. The modifications include a FireEdge FE200 LED capable of up to 300 mW emission centered at 280 nm (Phoseon Technology, Hillsboro OR). Custom UV optics were designed to focus the UV source to a 1 mm spot at the sample block face. A custom microscope is mounted laterally to observe the block face. The light path of this microscope is simply composed of a 10× objective (Olympus Plan Fluorite objective, 0.3NA), a tube lens (Olympus U-TLU), and a 0.5× camera adapter (Olympus U-TV0.5XC-3). A Thorlabs CNS500 objective turret is used to support additional objectives. Emitted fluorescence was detected using a line-scan color camera (Thorlabs 1501C-GE) that provides a theoretical throughput of 1392×23 Hz≈32000 pixels/s at 3 colors per pixel, resulting in a throughput of approximately 96 kB/s. This microscope was rigidly mounted to a two-axis translation stage (Thorlabs XYT1) for positioning and focusing.

Materials and Methods

Tissue collection and labeling. Mice were euthanized using $CO_2$ based on guidelines provided by the American Veterinary Medical Association (AVMA). Mice were then perfused transcardially with 20 mL of room temperature phosphate-buffered saline (PBS) solution (pH 7.4), followed by 20 mL of room temperature 10% neutral-buffered formalin (pH 7.4). Perfusion with PBS and formalin removes blood from the circulatory system and fixes the tissue.

Mice were then perfused with 10 mL of undiluted India-ink at a rate of ≈1 mL/s. Multiple vascular stains were tested, including polyurethane resin (vasQtec PU4ii) and fluorescent tattoo ink (Skin Candy). Both fluorescent labels provided excellent contrast using block-face imaging. However, vasQtec resin was degraded by alcohol during dehydration prior to perfusion (both ethanol and isopropyl alcohol were tested). While the fluorescent tattoo inks survived embedding, the dyes were composed of fluorescent particles ≈1 µm, resulting in blockages that prevented capillary labeling. We found that India ink (Higgins) provided adequate perfusion and contrast for MUVE imaging.

Organs were then removed and fixed in 10% neutral-buffered formalin for 24 h and finally stored in 70% ethanol ($C_2H_5OH$). Optionally, tissue samples were also stained using a variety of compounds to provide cellular contrast, including DAPI, Hoechst, and Eosin for fluorescent imaging and thionine for negative-contrast Nissl staining.

FIGS. 6A-6F show MUVE imaging of different mouse organs embedded in UV27-doped paraffin wax. (a) Singleplex imaging of mouse lung stained only with HO342. (b) Duplex imaging of mouse cerebellum perfused with India-ink and treated with DAPI. (c) Duplex imaging of mouse kidney stained with Eosin and HO342. (d) Singleplex imaging of mouse testicle stained only with HO342. (e) Duplex imaging of mouse liver perfused with India-ink and treated with HO342. (f) Duplex imaging of mouse spleen stained with Eosin and HO342.

Specimen preparation and embedding. Organs were embedded in paraffin wax for imaging. UV penetration was controlled by doping molten paraffin with up to 14% UV27 dye (Epolin). Similar protocols were followed for all ranges of doped paraffin infiltration. Organ sections were dehydrated through a series of graded ethanols (70 to 100%) over the course of 8 h, followed by clearing with xylene substitute (SIGMA A5597) for 3 h. Standard paraffin wax (Tissue-Tek Paraffin) was selectively doped with UV27 at 60° C., and samples were soaked in the selected mixture for 2 h to allow infiltration. The paraffinization process was performed with the aid of a tissue processor (Leica TP1020). Note that tissue shrinkage is always expected during paraffinization procedures and the degree of shrinkage can reach up to 40% in volume for brain tissue. This can be potential avoided using matrices that have low shrinkage artifacts, such as glycolmethacrylate resins (Electron Microscopy Sciences Technovit 7100) or urethane rubbers (Smooth On Clear Flex 95). In particular, we found that Technovit was highly UV opaque, but significantly more difficult to mill.

FIGS. 7A-7L show Monte-Carlo simulations of confocal and MUVE point-spread-functions using coupled-wave theory for absorbance in a layered homogeneous substrate. All simulations show x-polarized coherent light propagating from left to right and intensities are normalized for each image. Contours indicate (from darkest to lightest) 1%, 10%, and 30% thresholds of maximum intensity. (a-c) Confocal PSFs for imaging in idealized (i.e. cleared) samples using 0.4NA (left), 0.8NA (center), and 1.0NA (right) objectives. In MUVE imaging, exponential absorbance of the excitation is the dominant factor describing the axial PSF. (d-f) Incident deep-UV light is shown incident on a sample using a low-NA (=0.25) objective. Varying the molar absorbance by doping the embedding compound reduces penetration, creating a smaller axial PSF. A UV-transparent sample (left) shows a significant contribution from back-scattered light. However, doping with UV27 (center, right) results in a significant improvement over high-end confocal imaging. (g-i) The excited region of the samples scales with the penetrating UV PSF, however ablation results in truncation of the left half. (bottom) A comparison is shown between confocal and MUVE axial PSFs profiles (j-l). Lateral resolution is theoretically identical between MUVE and confocal.

FIGS. 8A-8E show central profiling of microspheres using a wide-field fluorescence microscope (a,d) and MUVE (c,e). The axial measurements of micro-beads (≈4 µm) were collected at a 1.0 µm sectioning size for both optical and physical sectioning. Intensity plots (b) were measured across the central line along the cutting direction indicated by a white arrow. 3D volume rendering of large beads (=500 μm) showing imaging artifacts such as shadows (indicated by black arrows) involved in optical sectioning microscopy.

FIGS. 9A-F show advantages of MUVE imaging as 3D microscopy. (a) Block-face imaging of paraffin-embedded brain (top) and UV27-doped paraffin-embedded brain (bottom) using a wide-field fluorescence microscope with DAPI excitation (390 nm). Near-visible penetration in tissue is large in both cases, making it impossible to reconstruct the 3D structure of microvessels. (b) Block-face imaging of paraffin-embedded brain (top) and UV27-doped paraffin-embedded brain (bottom) using MUVE (same regions as shown in (a)). Deep-UV penetration in tissue is significantly shorter than that of near-visible and UV27 infiltration further reduces the excitation volume. (c) Isosurface rendering of paraffin-embedded brain (top) shows uneven vessel surface reconstruction whereas isosurface rendering of UV27-doped paraffin-embedded brain (bottom) shows sharp and smooth vessel surface reconstruction.

FIGS. 10A-10D show coronal MUVE imaging of mouse midbrain stained with India-ink. (a) Volume rendering of the entire data set (389×241×2134 μm) showing the densely-connected microvascular network. (b) One complete cross section (z-axis position indicated by a yellow arrow) with a maximum intensity projection (MIP) overlapped over half. (c,d) Close-up view of small regions (128×128×128 μm) showing that the sampling resolution of MUVE is large enough to resolve microvessels with different sizes.

Figure 11A:
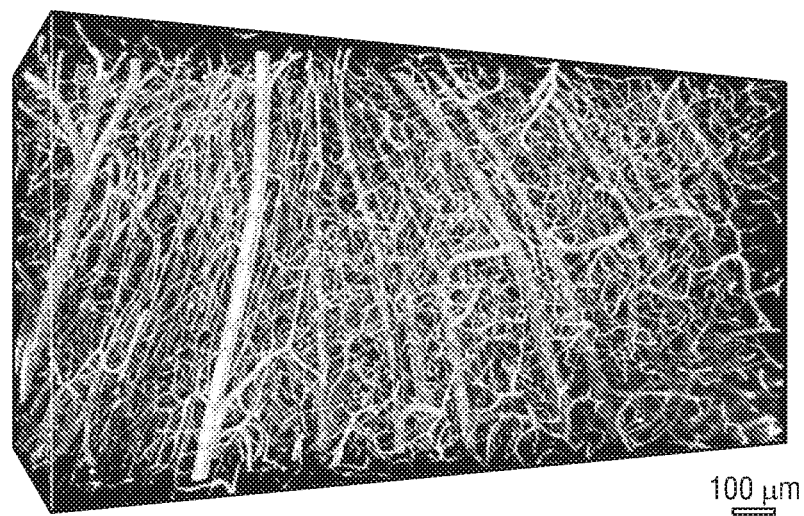
FIGS. 11A-11B show mouse cerebral cortex microvasculature and segmentation.
Figure 11B:
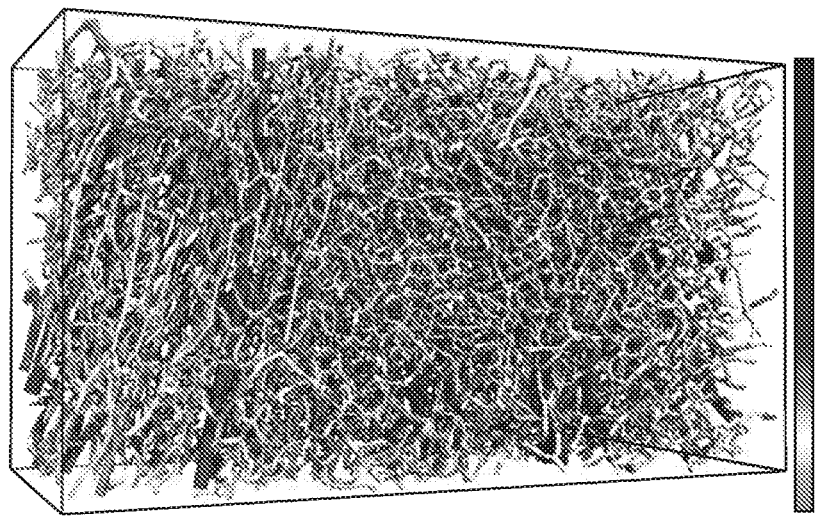

FIGS. 11A-11B shows mouse cerebral cortex microvasculature (a) and segmentation (b).

Other nuclear stains, such as DAPI and Hoechst (HO342), are compatible with India ink perfusion. While these stains are subject to bleaching during paraffin infiltration, it was found that paraffinized samples can be stained with DAPI and Hoechst, with penetration up to 1 mm after 3 days of in solution. For example, the Hoechst solution was prepared by diluting the HO342 stock solution (Thermo Fisher Hoechst 33342) 1:2000 in 1×PBS. This also allows staining of 1 to 5 μm embedded tissue (FIGS. 6A-6F). Staining was performed by covering the block face with solution for 2 to 3 min prior to imaging.

Image collection. Conventional microtome blades (DU-RAEDGE Low Profile) were used for cutting, with a cutting angle of 10° (FIG. 1B). The single stroke operation mode of the microtome was used for semi-automated acquisition. Cutting velocities were randomized to prevent the reinforcement of artifacts such as knife chatter. However, the resting position of the microtome oscillates slightly around its central position causing an offset along the cutting direction. An automated alignment algorithm was applied, available in OpenCV for compensation. Camera triggering used an image acquisition software package (Thorlabs ThorCam) controlled using an external TTL signal. Images were acquired using 100 ms exposure with a digital gain of 40, and image corrections were performed to adjust brightness and contrast using ImageJ. It took approximately 4 s for each slice: 2 s for cutting, 1 s for stage stabilization, and 1 s for image capturing. This process takes approximately 2 hours to collect 2,000 slices. While this prototype system uses a commercial microtome, a fully-automated system could achieve a data rate similar to 3D color histology for three-dimensional samples.

Results

Point spread function characterization. The lateral resolution of MUVE is diffraction limited, and similar to fluorescence microscopy is determined by the emission wavelength and objective numerical aperture (NA). The lateral resolution was verified using a USAF 1951 resolution test target (Edmund Optics). Images provided herein were acquired using a 40× Nikon objective (0.6NA). The horizontal construction of our MUVE prototype prohibited the use of immersion objectives, however previous work has already demonstrated MUSE compatibility with water-immersion optics.

MUVE axial resolution is dominated by the exponential absorbance of the embedding medium (FIGS. 7A-7L). The presented prototype provides axial resolution beyond the diffraction limit due to limitations in the NA of air objectives. Further studies may be performed to determine the practical PSF in other imaging media.

MUVE resolution benefits were validated by imaging a phantom composed of 1 to 5 μm fluorescent green beads (Cospheric Polyethylene Microspheres), (em. 515 nm) which were diluted 1000-fold into UV27-doped paraffin wax. MUVE was compared with wide-field fluorescence microscopy (Nikon Eclipse TI-E Inverted Microscope) using conventional excitation at 390 nm (DAPI excitation). The MUVE axial PSF shows a notable improvement over the traditional pattern of the wide-field microscope (FIGS. 8A-8E). The benefits of the MUVE PSF come in two forms: (1) physical ablation results in a truncated asymmetric emission spot, since previous layers of the sample have been removed, and (2) absorbance of the doped embedding medium dominates the penetrating half of the PSF. This allows reconstruction of elements (i.e. lower parts of spheres) obstructed using optical sectioning.

FIGS. 12A-D show coronal MUVE imaging of mouse thalamus stained with India-ink and thionine. (a) Tissues are dark red, while cell nuclei are dark brown (arrow), and vessels are black (dashed arrow) under UV illumination (left), providing enough contrast to segment both the cellular and vascular structures (right). (b) Volume rendering of the entire data set shows the density and organization of microvasculature with surrounding cellular details. (e) Volume rendering of a small region (100×100×100 μm) shows series of connected microvessels (c) along with their associated cells (d), and separate channels show detailed cellular and vascular structures.

Figure 6C:
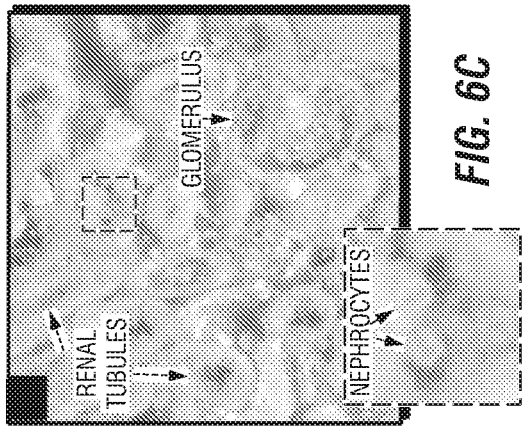
FIGS. 6A-6F show MUVE imaging of different mouse organs embedded in UV27-doped paraffin wax.
Figure 6F:
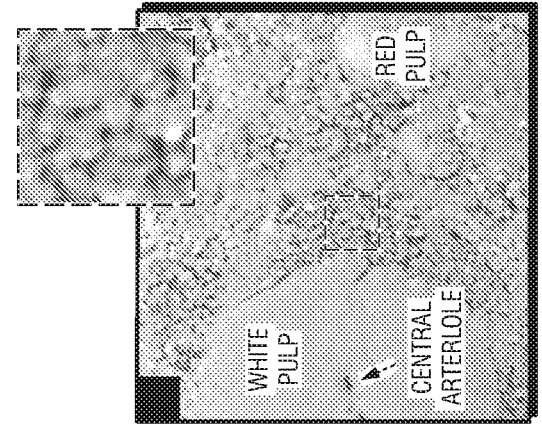
Figure 6B:
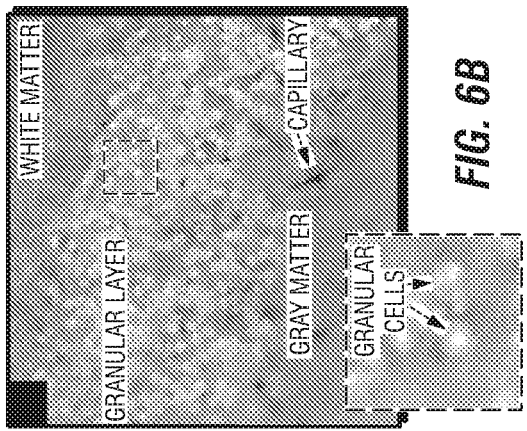
Figure 6E:
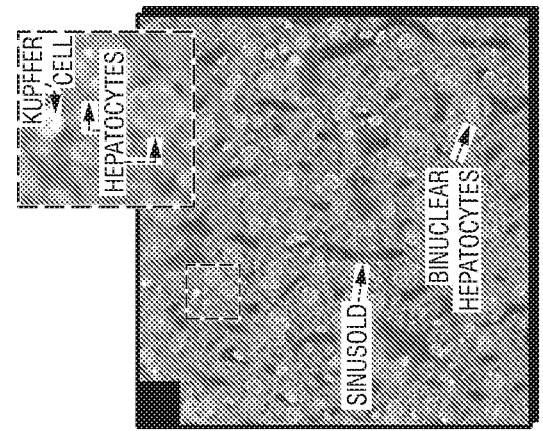
Figure 6A:
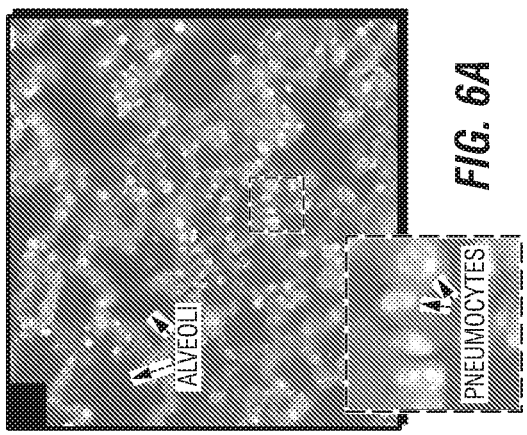
Figure 6D:
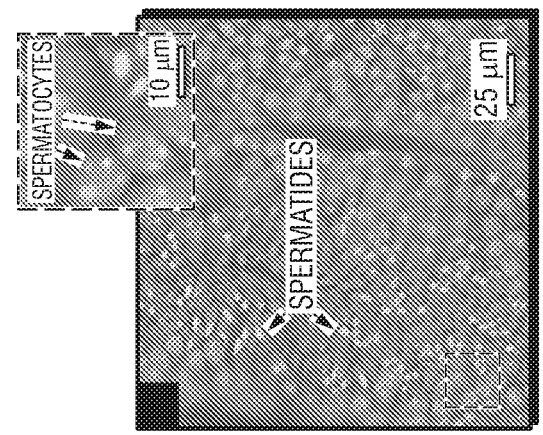
Figure 7A:
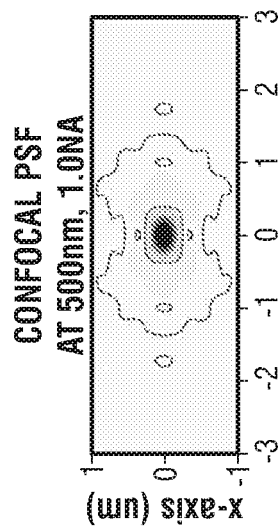
FIGS. 7A-7L show that the MUVE axial resolution is dominated by the exponential absorbance of the embedding medium.
Figure 7B:
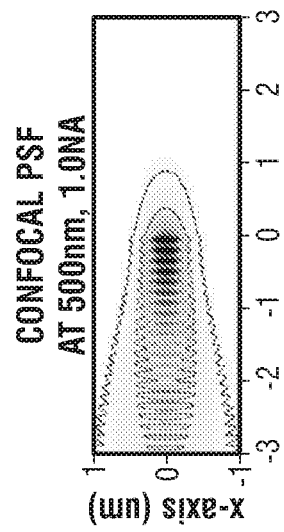
Figure 7C:
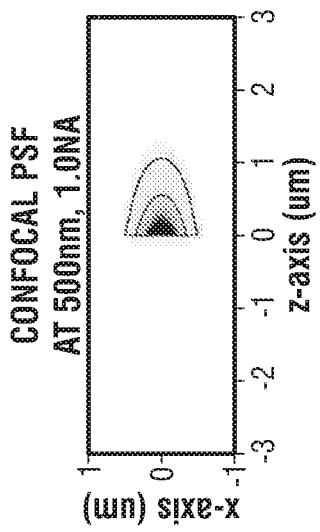
Figure 7D:
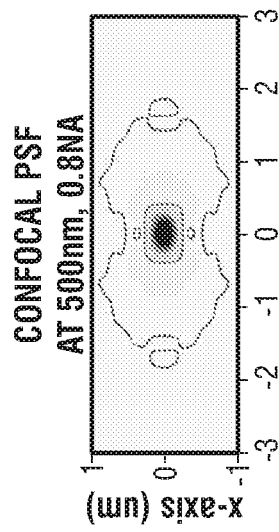
Figure 7E:
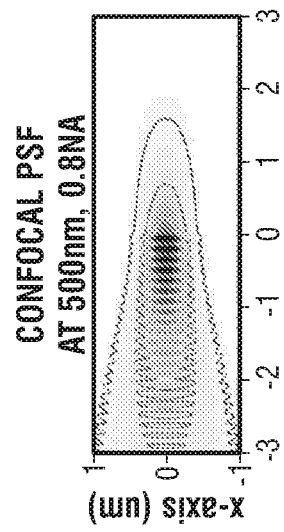
Figure 7F:
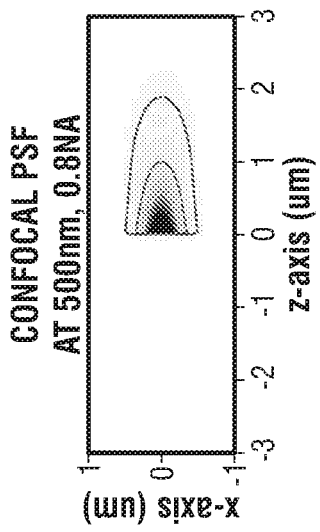
Figure 7G:
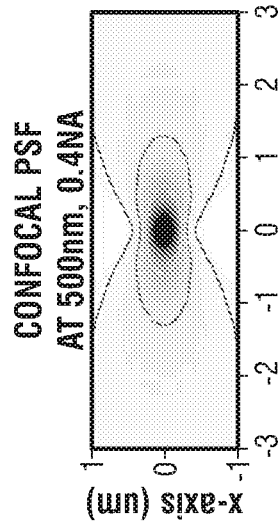
Figure 7H:
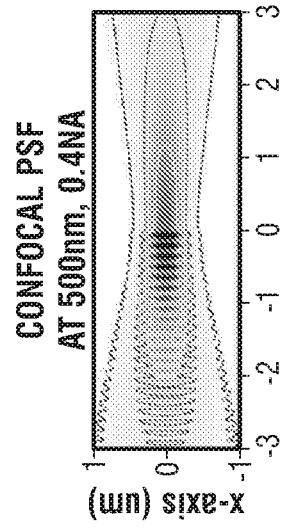
Figure 7I:
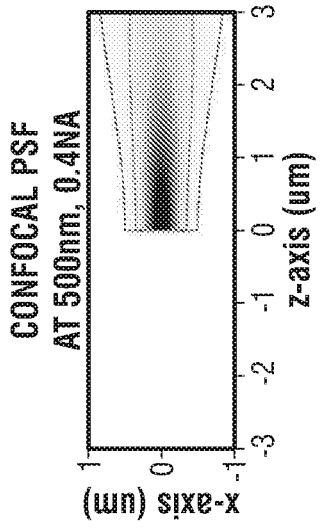
Figure 7J:
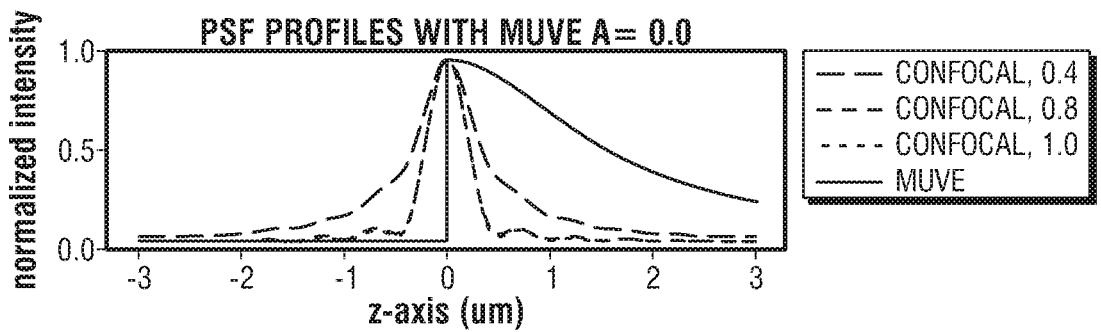
Figure 7K:
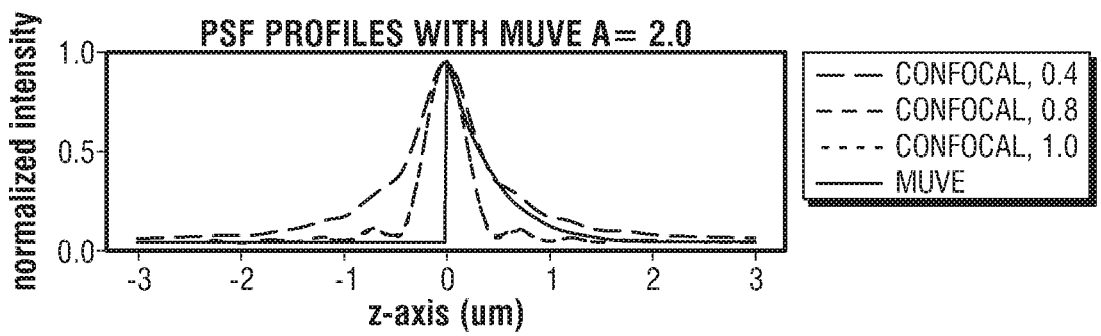
Figure 7L:
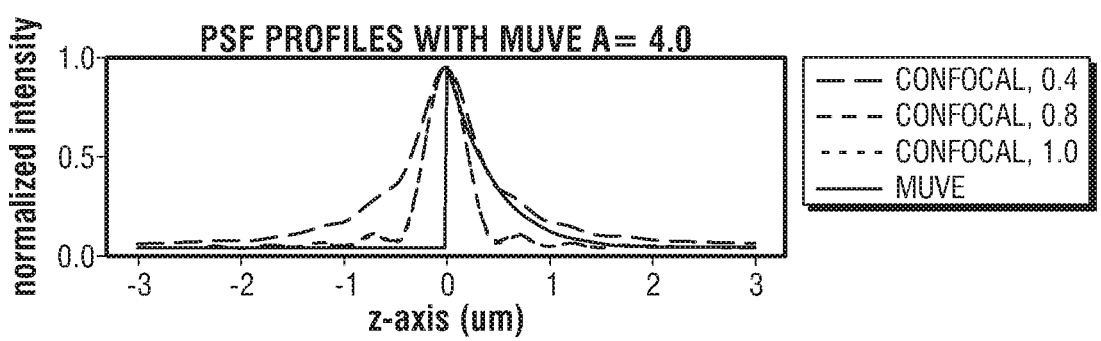
Figure 8A:
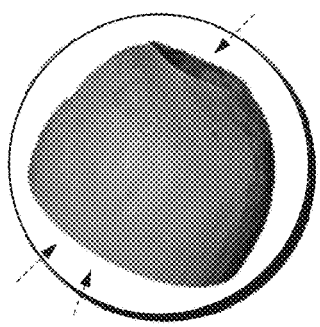
FIGS. 8A-8E show central profiling of microspheres using a wide-field fluorescence microscope and MUVE.
Figure 8C:
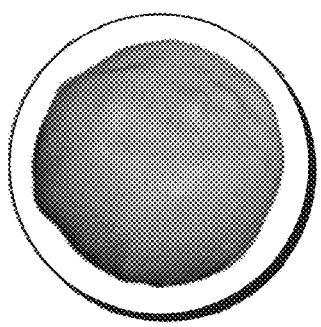
Figure 8B:
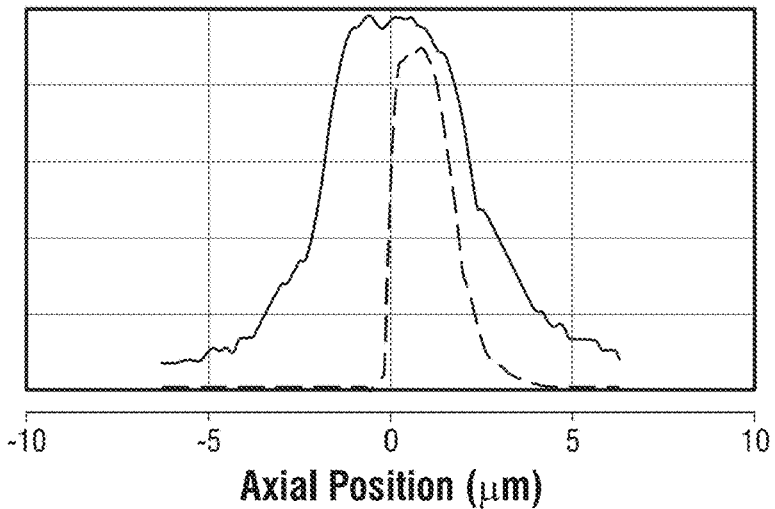
Figure 8D:
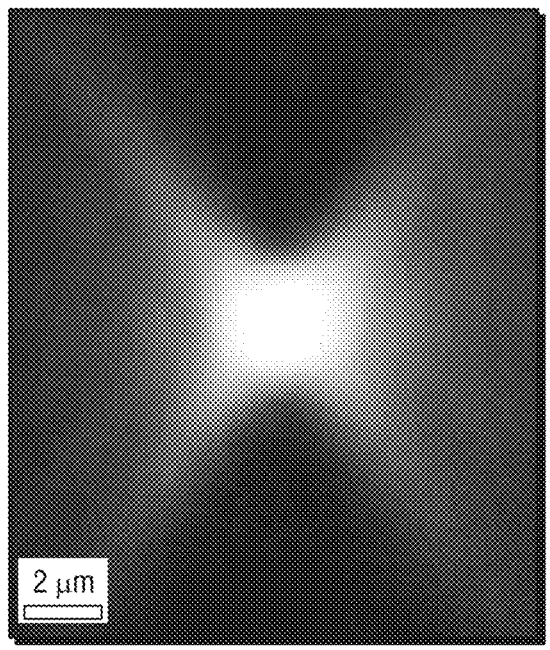
Figure 8E:
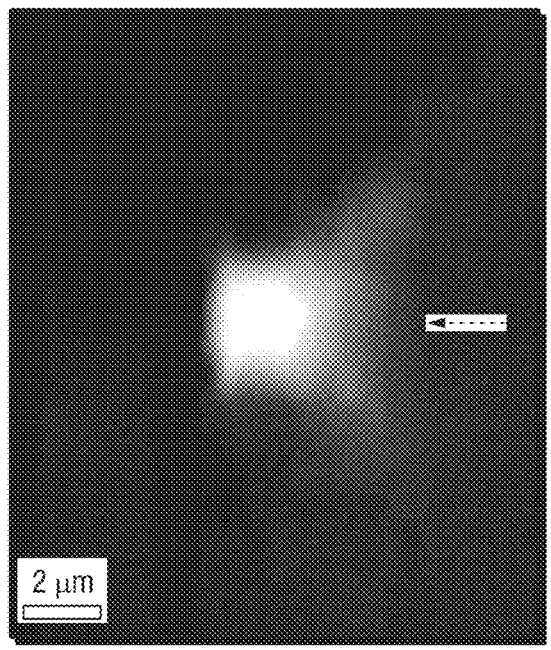
Figure 10A:
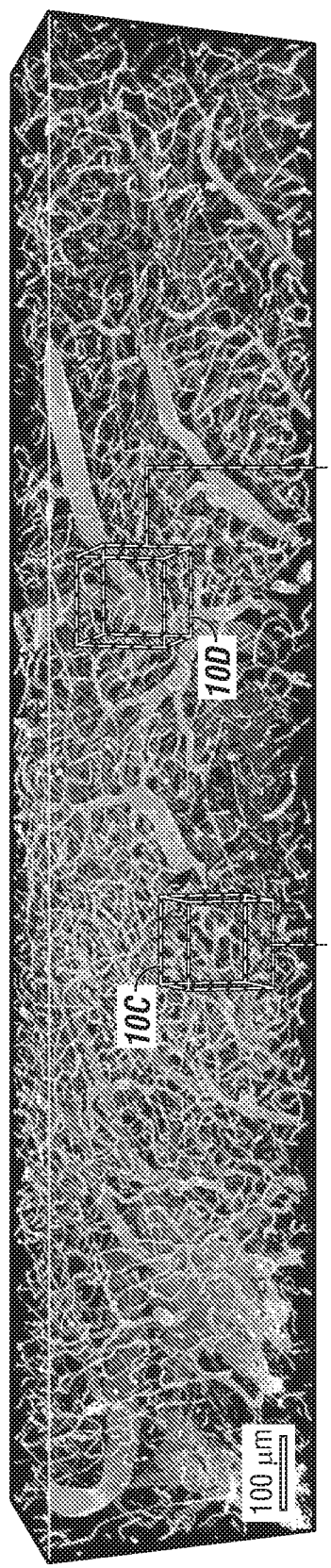
FIGS. 10A-10D show coronal MUVE imaging of mouse midbrain stained with India-ink.
Figure 10D:
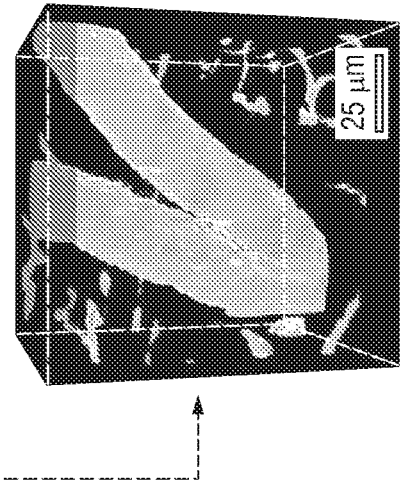
Figure 10C:
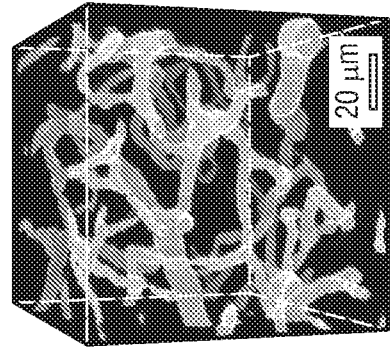
Figure 10B:
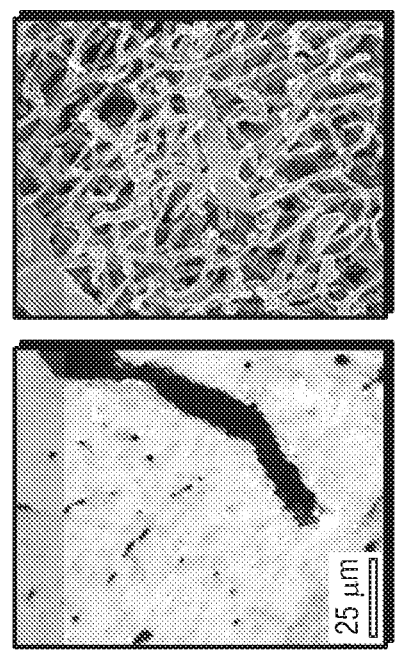

Block-face imaging of fluorescent samples. Mouse organs, including brain, kidney, liver, lung, spleen, and testicle were embedded in UV27-doped paraffin wax and stained after embedding with DAPI. MUVE axial resolution sufficient to resolve individual cell bodies and their chromatin distributions. For example, two types of pneumocytes are distinguishable in the lung image (FIG. 6A) and Kupffer cells and hepatocytes are also distinguishable in the liver (FIG. 6E). Cerebellar neurons within the granular are also clear to determine, along with their chromatin structure (FIG. 6B). The use of oblique UV illumination reveals tissue topographical information with enhanced contrast, consistent with previously published MUSE images. For example, surface profiles of kidney renal tubules are visible using Eosin (FIG. 6C).

The effectiveness of UV27 doping is shown using conventional microscopy (FIGS. 9A,D), MUSE (FIGS. 9B,E) and MUVE reconstructions (FIG. 9C,F). Direct comparisons in light penetration and reconstruction behaviors between conventional paraffin embedding, which introduces some UV absorption, and UV27-doped paraffin-embedding tissues. For instance, the 3D reconstruction of paraffin-embedded tissue shows large and rough microvascular structures whereas the 3D reconstruction of UV27-doped paraffin-embedded tissue shows fine and smooth capillaries.

Microvascular imaging. UV excitation is compatible with absorbing (negative) stains, where contrast is provided by exciting auto-fluorescence in the surrounding tissue and embedding compound. This is particularly useful for microvascular reconstructions using India-ink (FIGS. 10A-D), which mitigates the need for expensive fluorescent alternatives, such as lectins. This data set was imaged with a lateral sample spacing of 0.37 µm and a 2.0 µm cutting interval. Such spatial resolution is capable of reconstructing the smallest capillaries and their surface profiles.

While the varying vessel thickness can introduce gaps in volume visualizations (FIG. 10D), the images are particularly high contrast and simple to segment using existing algorithms. To better demonstrate this advantage, a region of the mouse cerebral cortex that has remarkable microvascular patterns was selected from an India-ink perfused mouse brain. Images were collected at an effective resolution of 1.29 µm with a 3.0 µm section size. An automated segmentation algorithm was applied to this data set, generating an explicit graph model with approximately 8,000 edges and 100,000 vertices of the cortical microvascular network (FIGS. 11A-B), which was visualized using ParaView (Kitware). This algorithm also provides an estimated radius, however more accurate methods can potentially be used as a post-processing step. Note that networks of this size are challenging to reconstruct with optical sectioning due to increased light scattering with sample depth.

Microvascular and nuclear imaging. Finally, combination staining of both microvasculature and nuclei in the brain was investigated using thionine with India ink perfusion (FIG. 12A-E). A region of the mouse thalamus was imaged at a 0.37 µm lateral resolution with 1.0 µm axial sections to resolve cell nuclei (FIG. 12B). This demonstrates potential for studying cellular-vascular relationships linked to many neurodegenerative diseases. This data set was manually segmented using the multi-thresholding function in Amira (ThermoFisher) and visualized using volume rendering (FIG. 12C-E).

A high-throughput imaging methodology is introduced for multiplex imaging of large-scale samples at sub-micrometer resolution at low cost. MUSE milling is capable of imaging densely-interconnected microvascular networks, opening the door to simple acquisition and quantification of capillary changes common during disease progression and guide the fabrication of in vitro disease models. The proposed technique is compatible with a wide range of existing objectives, and can be integrated into immersion-based imaging systems to provide lateral resolution equivalent to existing fluorescence techniques. While MUSE milling eliminates constraints on sample depth, additional UV doping of embedding compounds improvement may provide further reduction and quantify axial resolution. Finally, the proposed method provides comparable speed to 2D fluorescence imaging, and was able to produce a deep microvascular network (≈2 mm) within 2 hours using an automated microtome. While the prototype is limited to a single field of view (FOV), custom microtome using 3-axis stages can provide a cost-efficient technology that is simple to build and maintain in most laboratories.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described, including various combinations of the different elements, components, steps, features, or the like of the embodiments described, and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for 3D imaging, the method comprising:
preparing a sample, wherein the sample is treated or stained with at least one imaging agent to produce a treated sample;
embedding a treated sample in a supporting matrix to produce an embedded sample;
positioning the embedded sample for imaging;
exciting an exposed surface of the embedded sample with a UV source, wherein the embedded sample is obliquely excited by the UV source at a desired angle;
capturing one or more images of a region of the exposed surface, wherein the one or more images form a set of images representing an entirety of the exposed surface;
cutting a layer of the embedded sample imaged in the capturing step, wherein the layer is a flat, planar layer removed after being imaged; and
repeating the capturing and cutting steps for a next exposed surface exposed by a prior cutting step.

2. The method of claim 1, wherein the at least one imaging agent comprises multiple imaging agents utilized for multi-channel imaging.

3. The method of claim 2, wherein the capturing steps are performed filter-free for the multi-channel imaging.

4. The method of claim 1, wherein the at least one imaging agent is 4',6-diamidino-2-phenylindole (DAPI), Hoesch 33342 (HO 342), eosin, GFP, fluorescent ink, fluorescent resin, acrylic ink, vasQtec UV-yellow, vasQtec PU4ii, fluorescein, isothiocyanate (FITC), rhodamine, quantum dots (QDs), UV27, or epolin.

5. The method of claim 1 wherein the supporting matrix is a wax, paraffin wax, hydrogel, resin, or glycol methacrylate.

6. The method of claim 1, wherein the embedded sample is rectangularly shaped, squarely shapes, a cube, or a rectangular cuboid.

7. The method of claim 1, wherein the supporting matrix absorbs UV or includes a second imaging agent.

8. The method of claim 1, wherein the sample is prepared for imaging of vascular morphology, microvascular imaging, corrosion casting, or immunostaining.

9. The method of claim 1, wherein the capturing step comprises mosaicking to capturing multiple images that cover the entirety of the exposed surface by capturing a first image of a first region, shifting the embedded sample or camera to capture a next image of a next region adjacent to the first region, and repeating shifting and capture until the entirety of the exposed surface is imaged.

10. The method of claim 1 further comprising the step of assembling a 3D image of the tissue sample from a set of 2D images.

11. A 3D imaging kit, the kit comprising:
a UV source attachment arranged to excite regions of a tissue sample, wherein the tissue sample is treated or stained with at least one imaging agent and embedded in a supporting matrix to produce an embedded sample, and wherein the UV source attachment comprises a UV source capable of generating a UV signal, wherein the embedded sample is obliquely excited by the UV source at a desired angle, a mount mounting the UV source attachment, and adjustment components allowing adjustment of the UV source in x, y, and/or z directions; and a precision stage attachment for capturing one or more images of a region of an exposed surface excited by the UV source, wherein the precision stage attachment comprises a camera for capturing the one or more images of the embedded sample, wherein the one or more images form a set of images representing an entirety of the exposed surface, and a support securing the camera in a position near sample for capturing the one or more images, wherein when a next exposed surface is revealed, the camera captures one or more next images of a next exposed surface, and 3D image is assembled from the one or more images and the one or more next images.

12. The kit of claim 11 further comprising a blade assembly for cutting layers of the embedded sample, wherein the blade assembly comprises a specimen plane providing a location for the embedded sample to be placed;

a blade; and a blade actuator to precisely move the blade in x, y, and/or z directions to cut flat, planar layer, wherein the blade assembly removes the flat, planar of the embedded sample after imaging to reveal the next exposed surface.

13. The kit of claim 11, wherein the camera is filter-free for multi-channel imaging.

14. The kit of claim 11, wherein the camera captures multiple images that cover the entirety of the exposed surface by capturing a first image of a first region, shifting the embedded sample or camera to capture a next image of a next region adjacent to the first region, and repeating shifting and capture until the entirety of the exposed surface is imaged.

15. The kit of claim 12 further comprising a processor for automating operations of the UV source attachment, precision stage attachment, and/or blade assembly.

16. The kit of claim 11, wherein the at least one imaging agent is 4',6-diamidino-2-phenylindole (DAPI), Hoesch 33342 (HO 342), eosin, GFP, fluorescent ink, fluorescent resin, acrylic ink, vasQtec UV-yellow, vasQtec PU4ii, fluorescein, isothiocyanate (FITC), rhodamine, quantum dots (QDs), UV27, or epolin.

17. The kit of claim 11, wherein the supporting matrix is a wax, paraffin wax, hydrogel, resin, or glycol methacrylate.

18. The kit of claim 11, wherein the embedded sample is rectangularly shaped, squarely shapes, a cube, or a rectangular cuboid.

19. The kit of claim 11, wherein the supporting matrix absorbs UV or includes a second imaging agent.

20. The kit of claim 11, wherein the sample is prepared for imaging of vascular morphology, microvascular imaging, corrosion casting, or immunostaining.

\* \* \* \* \*

UNITED STATES PATENT AND TRADEMARK OFFICE
CERTIFICATE OF CORRECTION

| | | |
|---|---|---|
| PATENT NO. | : 12,117,380 B2 | Page 1 of 1 |
| APPLICATION NO. | : 17/294489 | |
| DATED | : October 15, 2024 | |
| INVENTOR(S) | : David Mayerich et al. | |

It is certified that error appears in the above-identified patent and that said Letters Patent is hereby corrected as shown below:

In the Specification

Please replace Column 1, Lines 12-18 with the following text:
--This invention was made with government support under grant number 1650536 awarded by the National Science Foundation. The government has certain rights in the invention--

Signed and Sealed this
Twenty-first Day of October, 2025

John A. Squires
*Director of the United States Patent and Trademark Office*